(12) United States Patent
Sotgiu et al.

(10) Patent No.: US 11,148,482 B2
(45) Date of Patent: *Oct. 19, 2021

(54) TYRE CHANGING MACHINE

(71) Applicant: Snap-on Equipment S.r.l., Correggio (IT)

(72) Inventors: Paolo Sotgiu, Modena (IT); Lillo Gucciardino, Bomporto (IT); Silvio Manicardi, Carpi (IT); Matteo Neri, Modena (IT)

(73) Assignee: Snap-on Equipment S.r.l., Correggio (IT)

( * ) Notice: Subject to any disclaimer, the term of this patent is extended or adjusted under 35 U.S.C. 154(b) by 195 days.

This patent is subject to a terminal disclaimer.

(21) Appl. No.: 15/774,949

(22) PCT Filed: Apr. 28, 2016

(86) PCT No.: PCT/IB2016/052413
§ 371 (c)(1),
(2) Date: May 9, 2018

(87) PCT Pub. No.: WO2017/081554
PCT Pub. Date: May 18, 2017

(65) Prior Publication Data
US 2018/0354320 A1 Dec. 13, 2018

(30) Foreign Application Priority Data

Nov. 10, 2015 (IT) .......................... 102015000070388
Nov. 10, 2015 (IT) .......................... 102015000070404

(51) Int. Cl.
*B60C 25/138* (2006.01)
*B60C 25/13* (2006.01)
*B60C 25/05* (2006.01)

(52) U.S. Cl.
CPC ........ *B60C 25/138* (2013.01); *B60C 25/0521* (2013.01); *B60C 25/13* (2013.01)

(58) Field of Classification Search
CPC .... B60C 25/13; B60C 25/138; B60C 25/0521
(Continued)

(56) References Cited

U.S. PATENT DOCUMENTS 3,168,130 A   2/1965  Turpin
3,493,030 A   2/1970  Strang et al.
(Continued)

FOREIGN PATENT DOCUMENTS

CN   2206221 Y   8/1995
CN   2332594 Y   8/1999
(Continued)

OTHER PUBLICATIONS

Square Automation, Ballscrew Linear Actuator with Stepper Motor; Jan. 1, 2015; https://www.youtube.com/watch?v=c5EvLZAwPVc; (Year: 2015).*
(Continued)

*Primary Examiner* — Hadi Shakeri
(74) *Attorney, Agent, or Firm* — Studebaker & Brackett PC

(57) ABSTRACT

A tyre changing machine includes a wheel support assembly for locking and setting in rotation a rim of a wheel from which to demount or on which to mount a tyre, and a bead breaking tool disposed at an end of a bead breaking arm and able to carry out the bead breaking operation. The bead breaking arm is movable between a disengaged position and a working position. A motor device has an output drive shaft for moving the bead breaking arm between the disengaged and working positions. Means for transmitting the drive from the motor device to the bead breaking arm include threaded means having an external screw-thread and hollow (Continued)

counter-threaded means operatively coupled with the threaded means. Connecting means operatively associate the means for transmitting the drive to the bead breaking arm.

15 Claims, 20 Drawing Sheets

(58) Field of Classification Search
USPC .................................................. 157/1.24
See application file for complete search history.

(56) References Cited

U.S. PATENT DOCUMENTS

| | | | |
|---|---|---|---|
| 3,780,785 A | | 12/1973 | Schultz et al. |
| 5,050,659 A | | 9/1991 | Scalambra |
| 5,300,090 A | * | 4/1994 | Primic ............... A61H 1/02 601/26 |
| 5,381,843 A | * | 1/1995 | Corghi ............. B60C 25/025 157/1.24 |
| 5,385,045 A | * | 1/1995 | Mannen ............ B60C 25/00 73/462 |
| 5,490,552 A | | 2/1996 | Vignoli |
| 6,247,516 B1 | * | 6/2001 | Sinclair ............ B60C 25/132 157/1.1 |
| 7,343,955 B2 | | 3/2008 | Cunningham |
| 7,500,504 B2 | | 3/2009 | Bonacini |
| 7,882,882 B2 | | 2/2011 | Cunningham |
| 8,257,226 B2 | * | 9/2012 | Reynolds ........... F02D 9/1065 477/107 |
| 8,613,303 B1 | | 12/2013 | Hanneken et al. |
| 8,776,858 B2 | | 7/2014 | Corghi |
| 9,114,675 B2 | | 8/2015 | Bonacini |
| 9,873,298 B2 | | 1/2018 | Ferrari et al. |
| 2011/0100558 A1 | | 5/2011 | Corghi |
| 2012/0291960 A1 | | 11/2012 | Bonacini et al. |
| 2016/0075196 A1 | | 3/2016 | Corghi |
| 2017/0050479 A1 | | 2/2017 | Ferrari et al. |

FOREIGN PATENT DOCUMENTS

| | | |
|---|---|---|
| CN | 1432487 A | 7/2003 |
| CN | 2767220 Y | 3/2006 |
| CN | 101138944 A | 3/2008 |
| CN | 102795063 A | 11/2012 |
| CN | 102963223 A | 3/2013 |
| DE | 2730815 A1 | 1/1978 |
| EP | 0448042 A2 | 9/1991 |
| EP | 0 557 618 A1 | 9/1993 |
| EP | 0644071 A1 | 3/1995 |
| EP | 0644071 B1 | 7/1997 |
| EP | 1 329 342 A1 | 7/2003 |
| EP | 1329342 A1 | 7/2003 |
| EP | 2319715 A1 | 5/2011 |
| EP | 2444260 A1 | 4/2012 |
| EP | 2484541 A1 | 8/2012 |
| EP | 2 524 819 A1 | 11/2012 |
| EP | 2 796 302 A1 | 10/2014 |
| EP | 2 927 028 A1 | 10/2015 |
| EP | 2 930 038 A1 | 10/2015 |
| GB | 2118493 A | 11/1983 |
| RU | 2088425 C1 | 8/1997 |
| WO | 2015/044917 A1 | 4/2015 |
| WO | 2015/170273 A1 | 11/2015 |

OTHER PUBLICATIONS

Genphoal, Linear Motor, Jan. 19, 2015, https://www.andmotor.com/linear-motor/ (Year: 2015).*
International Search Report and Written Opinion issued in International Patent Application No. PCT/IB2016/052413, dated Sep. 14, 2016; with English translation.
Office Action dated Feb. 20 2020 in corresponding U.S. Appl. No. 15/774,955.
Office Action dated Dec. 2, 2019 in corresponding Chinese Application No. 201680075040.X.
Search Report and Written Opinion dated Aug. 3, 2016 in corresponding International Application No. PCT/US2016/052412.
Office Action dated Nov. 29, 2019 in corresponding Chinese Application No. 201680075051.8.

* cited by examiner

TYRE CHANGING MACHINE

RELATED APPLICATIONS

This application is the U.S. National Phase under 35 U.S.C. § 371 of International Patent Application No. PCT/IB2016/052413, filed on Apr. 28, 2016, which in turn claims the benefit of Italian Application No. 102015000070388, filed on Nov. 10, 2015 and Italian Application No. 102015000070404, filed on Nov. 10, 2015, the entire disclosures of which Applications are incorporated by reference herein.

FIELD OF THE INVENTION

The present invention relates to a tyre changing machine comprising a bead breaking assembly generally usable for progressively debeading tyres in a controlled way from respective rims of vehicle wheels.

STATE OF THE ART

Apparatuses for mounting a tyre on a rim or for demounting a tyre from a rim are already known in the art and are generally identified with the term "tyre changing machine" or more simply "tyre-changer".

Tyre changing machines generally comprise an electric motor that activates a wheel support assembly for locking and setting in rotation a rim of a wheel from which to demount or on which to mount a respective tyre.

As is known, wheels for motor vehicles generally consist in a metal rim provided, at axial ends thereof, with appropriate containing annular flanges between which a gulley is defined for joint-inserting a tyre, with or without the presence of an inner tube.

In the mounted configuration, the lateral portions of the tyre, the "beads", abut on the containing flanges of the rim.

Tyre-changing machines enable, among other things, complete removal of the tyre from the rim. The procedure can be performed only after the tyre has been debeaded from the respective rim; in fact, as is known, before being able to completely remove the tyre from the rim it is necessary to detach the beads from the containing flanges.

The bead breaking operation is therefore carried out by a special bead breaking assembly (sometimes also termed a bead breaking assembly) and is preliminary to the actual demounting, the bead breaking tool normally being present and therefore associated to the tyre changing machine.

Such bead breaking assemblies can be of various types. One of the most widely used, which we might also term "traditional", has a bead breaking arm having a substantially horizontal longitudinal extension, hinged to the frame of the tyre changing machine and provided with a paddle-shaped bead breaking tool.

For example, patent publication no. IT-MO-2013-A-110 discloses a tyre changing machine provided with a bead breaking assembly comprising an arm rotatably associated to a machine support structure. The paddle-shaped bead breaking tool is rotatably associated to the rotatable arm which is movable between a disengaged position, in which the bead breaking tool is substantially distanced with respect to a tyre of the wheel to be debeaded, and a working position, wherein the bead breaking tool is adapted to engage on the tyre.

Likewise, patent publication IT-MO-2013-A-272 illustrates a tyre changing machine provided with a bead breaking assembly having a paddle-shaped tool, and comprising an arm hinged to the frame and activated by an appropriate hydraulic or pneumatic actuator.

Patent publication EP-A1-557618 illustrates a bead breaking device of traditional type, where the bead breaking arm is activated by a stem of a pneumatic jack associated to the base of the tyre changing machine. Said stem is provided with a plurality of notches adapted to engage with a hooking member mounted on the arm of the bead breaking. The hooking member can assume a rest position, in which it enables free sliding of the stem with respect to the arm, and a working position in which it maintains the latter hooked to one another.

Patent publication EP-A1-1329342 discloses a further variant of the bead breaking of the traditional type, in which a motor-reducer activates a crank means in rotation, to which a rod element is articulated offset, which rod element has an end freely-slidable internally of a transversally-holed peg and passing in turn through the arm of the tyre-changer. The rod element is provided with an abutting nut having anti-unscrewing security function from the peg hole, as well as a helical spring interposed between the security nut and the peg. In this way, a rotation of the crank means generates a traction on the arm of the bead breaker towards the wheel to be debeaded.

Patent publication IT-MO-2014-A-67 illustrates a tyre changing machine provided with the usual traditional bead breaking assembly comprising a longitudinally-extending arm substantially horizontal and provided with a paddle-shaped bead breaking tool, the arm being hinged to the frame of the machine and moved by an actuator interposed between the frame and said arm. The actuator is of the fluid type, i.e. it consists in a pneumatic or hydraulic actuator, such as a piston/cylinder couple, and is connected to a fluid activating circuit. The bead breaking assembly is activated by a control lever, arranged in a substantially vertical position of equilibrium, and hinged to the arm of the bead breaking about a substantially horizontal tilting axis. To activate the bead breaking assembly, the operator rotates the control lever about the tilting axis, towards or away from the wheel to be debeaded thus displacing said lever from the initial position of vertical equilibrium.

Patent publication IT-MO-2014-A-75 illustrates a tyre changing machine provided with the usual bead breaking assembly comprising a substantially horizontal arm and provided with a paddle-shaped bead breaking tool, the arm being hinged to the frame of the machine and moved by an appropriate actuator interposed between the frame and said arm. In this case, the tyre changing machine also comprises a wheel-raising member for loading the wheel on the locking chuck. The activating actuator is configured for being selectively connectable to the bead breaking arm or to the wheel-raising member.

Lastly, patent publication WO-A1-2015/170273 describes a bead breaking device of a traditional type, for tyre changing machines, having an oscillating arm hinged, at an end thereof, to the base of a tyre changing machine, and provided with a bead breaking tool supported at the opposite end to the hinge end. The arm is activated by an endless screw, activated in rotation by a motor group housed internally of the base of the tyre changer. The endless screw is engaged in an internally counter-threaded sleeve which is hinged to the oscillating arm with a hinge axis that is transversally perpendicular to said arm.

In general, a "traditional" bead breaking assembly often, though not always, has an actuator of a fluid-dynamic type, for example pneumatic. During the bead breaking operation the operator needs to keep a hand on the paddle or on a gripping handle of the paddle. The handle is sometimes part of an actual control lever for activating the fluid actuator. In all these cases, as during the bead breaking operation the detachment of the tyre can occur unexpectedly as the force applied by the paddle exceeds a certain threshold value, beyond which the bead separates from the rim, the operator's hand is subject to unpleasant jolts. This means that the bead breaking step is extremely uncomfortable and even dangerous for the operator, who is pulled and subjected to the counter-blow from the bead breaking arm. Further, at these moments the operator also loses sensitivity in the control of the control lever of the actuator of the bead breaker, which can lead to damage to the tyre or the rim of the wheel.

The solutions disclosed in the prior art, substantially linked, for this type of tyre changing machine with a "traditional" bead breaking assembly, to the use of fluid-dynamic actuators, do not completely obviate the above-described drawbacks.

Over time bead breaking assemblies of the traditional type have therefore been disclosed, but activated by actuators not of the fluid-dynamic type. In this case, however, the known solutions often have the problem of an incomplete automation of the process of movement of the oscillating arm. Other problems encountered in the prior art, in the case of traditional bead breaking assemblies but activated by actuators not of the fluid-dynamic type, are involved for example in the poor velocity of the bead breaking process, with respect to the solutions having fluid-dynamic actuation, especially during the step of recall of the oscillating arm towards the disengaged position, i.e. when the bead breaking tool is to be distanced from the tyre to be debeaded, or just debeaded. In addition, some from among these known systems can be easily affected by annoying problems of mechanical jamming.

Aim of the Invention

In the light of the above, the Applicant set the objective of providing a tyre changing machine comprising a bead breaking assembly, able to obviate the unresolved, or partially resolved, drawbacks found in the prior art.

An aim of the present invention is therefore to provide a tyre changing machine that is safe and practical to use, in particular during the bead breaking step.

A further aim of the present invention is to disclose a tyre changing machine comprising a bead breaking assembly, which allows a high degree of control over the bead breaking process by the operator, preventing any possibility of damaging the tyre or the rim of the wheel.

A further aim of the present invention is to provide a tyre changing machine that is simple to maintain, sturdy and reliable, as well as economical.

A further aim of the present invention is to disclose a tyre changing machine comprising a bead breaking assembly, which while not having the typical defects of bead breaking assemblies activated by fluid-dynamic type actuators, imitates them however and possibly exceeds them in terms of advantages and performance, in particular in the degree of automation of the bead breaking operation and the velocity of execution thereof.

These and other aims will be obvious to a person skilled in the art, from the following description and the appended drawings.

SUMMARY OF THE INVENTION

The Applicant has found that such objectives and aims can be attained by a tyre changing machine comprising at least a bead breaking arm.

In an embodiment, the longitudinal direction of the bead breaking arm is substantially horizontal with respect to a rest plane of the frame of the tyre changing machine, i.e. substantially parallel to said rest plane. In other embodiments, the bead breaking arm can be slightly inclined with respect to the rest plane of the frame of the tyre changing machine, for example by about 15° or even more, so as to operate more easily on large-dimension wheels.

The bead breaking arm has a first end associated or associable to the frame, or bearing structure, of said tyre changing machine, for example hinged thereto about a rotation axis that is substantially vertical, directly or even indirectly, for example via an intermediate arm. The bead breaking arm can also be associated in a different way to the frame, for example it can be mounted slidably on an appropriate seating and therefore can simply translate instead of rotating or roto-translating.

A bead breaking tool is associated to a second end of said bead breaking arm and able to carry out the bead breaking operation of the tyre of a wheel.

In a particular embodiment, the bead breaking tool is paddle-shaped or blade-shaped.

In other embodiments, the bead breaking tool can have a roller, cone, rotating disc or another shape.

The bead breaking arm is movable between a disengaged position, in which said bead breaking tool is substantially distanced with respect to the tyre of the wheel to be debeaded, and a working position, wherein said bead breaking tool can engage on the tyre.

The tyre changing machine according to the present invention further comprises an output drive shaft for moving the bead breaking arm between the disengaged position and the working position and/or vice versa.

In a preferred embodiment, the motor device is an electric motor provided with an appropriate output drive shaft.

The tyre changing machine according to the present invention further comprises a wheel support assembly, mounted on the frame, for locking and set in rotation a rim of a wheel from which to demount or on which to mount a respective tyre.

Preferably, though not necessarily, the wheel support assembly is such that the wheel is generally locked and set in rotation on the support assembly about a vertical axis, and the bead breaking arm has, as mentioned, a longitudinal direction that is substantially horizontal.

According to a particular embodiment, however, the wheel support assembly might be able to set the wheel to be operated on in rotation about a non-vertical axis, for example about a horizontal axis.

According to a further embodiment, the wheel support assembly might be able to tilt between a horizontal position and a vertical position, and/or vice versa.

In a further embodiment, the tyre changing machine of the present invention comprises at least two bead breaking arms, each of which is dedicated to a particular bead of the wheel to be debeaded. For example, in a case where the wheel support assembly is arranged along a vertical direction, the two bead breaking arms will be arranged along respective substantially horizontal directions, at different heights with respect to the wheel locked on the wheel support assembly.

In this case, the first bead breaking arm will work on the lower bead of the tyre, while the second bead breaking arm will work on the upper bead of the tyre.

The tyre changing machine according to the present invention further comprises means for transmitting drive from the motor device to the bead breaking arm.

This means comprises threaded means having an external screw-thread and hollow counter-threaded means operatively coupled with the threaded means having an external screw-thread. In an embodiment, the threaded means with external screw-thread comprise a rod element having at least a first screw-shaped manoeuvring portion, for example but not necessarily, having a trapezoidal threading.

According to an embodiment, the hollow counter-threaded means comprises a tubular body, for example but not necessarily having a circular section, having a cavity, for example a through-cavity or in any case having an opening towards the outside, preferably at a longitudinal end thereof, which cavity comprises at least a portion in the shape of a nut screw operatively coupled to the screw-shaped manoeuvring portion of the rod element.

According to a possible embodiment, the coupling between the threaded means with external screw-thread and the hollow counter-threaded means is realised by use of ball screws, i.e. with the use of revolving bodies interposed between the screw and the nut screw.

According to a further embodiment, the means for transmitting drive from the motor device to the bead breaking arm is adapted to set the tubular body in rotation, internally of which the rod element is free to axially slide in screwing and/or unscrewing direction. According to an alternative embodiment, the means for transmitting drive from the motor device to the bead breaking arm are adapted to set the rod element in rotation, externally of which the tubular body is free to axially slide in screwing and/or unscrewing direction.

The tyre changing machine according to the present invention further comprises connecting means for operatively associating the above-described means for selectively transmitting drive described in the foregoing to the bead breaking arm. This connecting means are adapted to engage, in a free sliding coupling, the means for transmitting the drive, which further comprise a striker element adapted to engage with the connecting means and/or the bead breaking arm.

In a preferred embodiment, the rod element comprises a second portion, preferably not threaded, still more preferably smooth, destined to engage, in a free sliding coupling, in the connecting means.

According to a particular embodiment, the connecting means comprise a sleeve-shaped element for engaging said second portion of the rod element.

According to an embodiment, the rod element preferably has a circular section. However, other types of section are also possible, and in any case the sleeve-shaped element will have a cavity appropriately counter-shaped so as to correctly engage the rod element. It is also possible for the rod element to have different sections along the longitudinal extension thereof, for example a circular section in the first screw-shaped manoeuvring portion, and different type of section in the second portion thereof, destined to engage, in a free sliding coupling, in the connecting means.

According to a further embodiment, the connecting means comprise an element having a grooved profile, preferably but not necessarily of the dove-tail type, for engaging said second portion of the rod element, which has an appropriately shaped section.

According to an embodiment, the connecting means is hinged, by at least a pin, to the bead breaking arm. In a case in which the bead breaking arm is arranged along a substantially horizontal plane, the pin can be advantageously arranged along a vertical axis, so as to enable a rotating movement of the bead breaking arm about the pin axis.

In a preferred variant embodiment, the pins are at least two in number, arranged on opposite sides with respect to the bead breaking arm, in any case along the same vertical axis.

According to a preferred embodiment, the at least a pin is adapted to engage in a respective slot fashioned in the bead breaking arm. In a case where two pins are present, the bead breaking arm will comprise two respective slots.

According to a further embodiment, the connecting means are hinged, by means of at least a first pin, to an intermediate connecting element, for example an arm or con rod. The intermediate connecting element is in turn hinged, by at least a second pin, to the bead breaking arm.

According to an embodiment, the means for transmitting the drive from the motor device to the bead breaking arm further comprises a striker element, which is preferably mounted at the second portion of the rod element, preferably at a distal end thereof with respect to the frame of the tyre changing machine.

The striker element can either be engaged on the connecting means and/or on the bead breaking arm, which can be provided with respective abutment surfaces and/or appropriate damping means, for example springs or elastic pads.

The striker element, for example a nut, preferably also has a security function preventing the rod element from unscrewing from the connecting means, and/or an end-run function.

In a further embodiment, the tyre changing machine of the present invention further comprises a wheel raising device, associated to the frame of the machine, for moving the wheel from the rest surface of the tyre changing machine to the wheel support assembly and/or vice versa.

According a possible embodiment of the present invention, the tyre changing machine has a single motor device, preferably an electric motor, for moving both the bead breaking arm and the support assembly and/or further components, where present, such as for example the above-mentioned wheel raising device. In this embodiment, means for selectively transmitting drive from the electric motor to the bead breaking arm or to the wheel support assembly or to said further components is present. Said means can be activated by an operator, who can therefore choose, time by time, whether to use the electric motor for activating the wheel support assembly or the bead breaking arm or any other component of the machine, such as for example the wheel raising device.

The means for selectively transmitting drive can comprise any drive selector device associated to the electric motor of the tyre changing machine.

In a possible embodiment, the means for selectively transmitting the drive from the electric motor to the bead breaking arm or to the wheel support assembly or to other components of the tyre changing machine, comprise a drive selector device associated to the drive shaft, first drive transmission means mounted on the drive shaft and adapted to transmit the drive to the wheel support assembly, and second drive transmission means mounted on the drive shaft and adapted to transmit the drive to the bead breaking arm.

In a possible embodiment, said first and second drive transmission means can comprise a first and second pulley, respectively, as well as flexible transmission members such as cables, belts or chains.

In an alternative embodiment, said first and second drive transmission means can comprise respective geared transmissions, for example with a cascade of gears.

The drive selector device is generally adapted to be removably coupled to the first or the second drive transmission means, for example to the first or the second pulley or to the first or second gearings.

According to an embodiment, the coupling or enmeshing of the drive selector device is removable as the operator, by choice, can decouple or remove the selector device from determined drive transmission means and couple or enmesh it to other drive transmission means, which might be pulleys, gearings or the like, so as to transmit the drive to different components of the tyre changing machine, according to needs.

In a particular embodiment, the coupling and/or the decoupling of the drive selector device can also be done, partially or totally, automatically, on the basis of pre-ordered and/or possibly selectable functioning logics selected by the operator.

According to a further embodiment, the automatic coupling and/or the decoupling of the drive selector device is realised using actuating devices, activated by an electronic control system appropriately configured and possibly provided with connections with one or more sensors.

In a case where there are further pulleys or further gearings, for example for transmitting the drive to further components of the tyre changing machine, the selector device can also obviously couple removably to these.

For example, in a case where there is a wheel raising device, at least a further pulley or gearing is adapted to transmit the drive to the wheel raising device; the drive selector device can obviously be removably coupled also to said further pulley or gearing.

In a preferred embodiment, the drive selector device comprises a selector element, preferably having a circular crown shape, mounted radially fixed and axially movable on and with respect to the drive shaft. The coupling is for example realisable using grooved channels or the like, for example by means of a woodruff key coupling. Further, a control device is also present, preferably fork-shaped, so as to axially translate the selector element along the drive shaft and respectively enmesh the first, the second or further pulleys (or gearings).

The selector element can be of various types, for example with frontal enmeshings or lateral enmeshings. A drive synchroniser, a clutch or the like can be present. The enmeshing can be facilitated by use of a selector element having a portion with a truncoconical profile destined to couple with a corresponding cavity afforded in a respective pulley or gearing.

In a variant embodiment, the bead breaking arm can be provided, preferably in proximity of the bead breaking tool, with appropriate control means, for example a control lever for controlling the motor device and therefore for activating the movement of the bead breaking arm as well as, preferably, and in the context of the respective embodiment, also for controlling a drive selector device, where present.

The movement of the bead breaking arm can also be commanded by at least a pedal mounted on the frame of the tyre changing machine, and/or at least a button, for example but not necessarily, mounted on the above-mentioned control lever In an embodiment, the tyre changing machine of the present invention comprises a control rod connected, at a first end thereof, to the drive selector device and, at a second end thereof, to a control and stop element associated to the means for transmitting drive from the motor device to the bead breaking arm.

In a preferred embodiment, the control and stop element is shaped as a bracket having a first end associated to the control rod and a second end associated to the second portion of the rod element.

In a possible embodiment, the tyre changing machine of the present invention further comprises a flexible control member, for example of a Bowden cable, push-pull, sheath, tie rod or the like, activatable by the control means and operatively connected to the control rod, for coupling the drive selector device to the first and/or second drive transmission means and for displacing the control and stop element from a rest position, in which said control and stop element is in a distal position with respect to the means for transmitting drive from the motor device to the bead breaking arm, to an operating position, in which said control and stop element is in a proximal position with respect to said means for transmitting drive.

In a preferred embodiment, the control and stop element is preloaded by appropriate elastic means, which keep it in the rest position.

Again according to a preferred embodiment, by activating the control means, the control and stop element can overcome the force of the elastic preload means and displace into the operating position.

BRIEF DESCRIPTION OF THE DRAWINGS

Further characteristics and advantages of some preferred, but not exclusive, embodiments of a tyre changing machine according to the present invention will appear more clearly from the detailed description.

This description will be explained below with reference to the attached drawings, provided solely for indicative and therefore non-limiting purposes, in which.

DETAILED DESCRIPTION OF PREFERRED EMBODIMENTS OF THE INVENTION

In the description that follows, any expressions used, for example "right", "left", "above", "below", "upper", "lower" and the like, have a merely illustrative aim and refer to the particular arrangement of the elements present in the accompanying figures, and therefore have no limiting characteristics.

Figure 1:
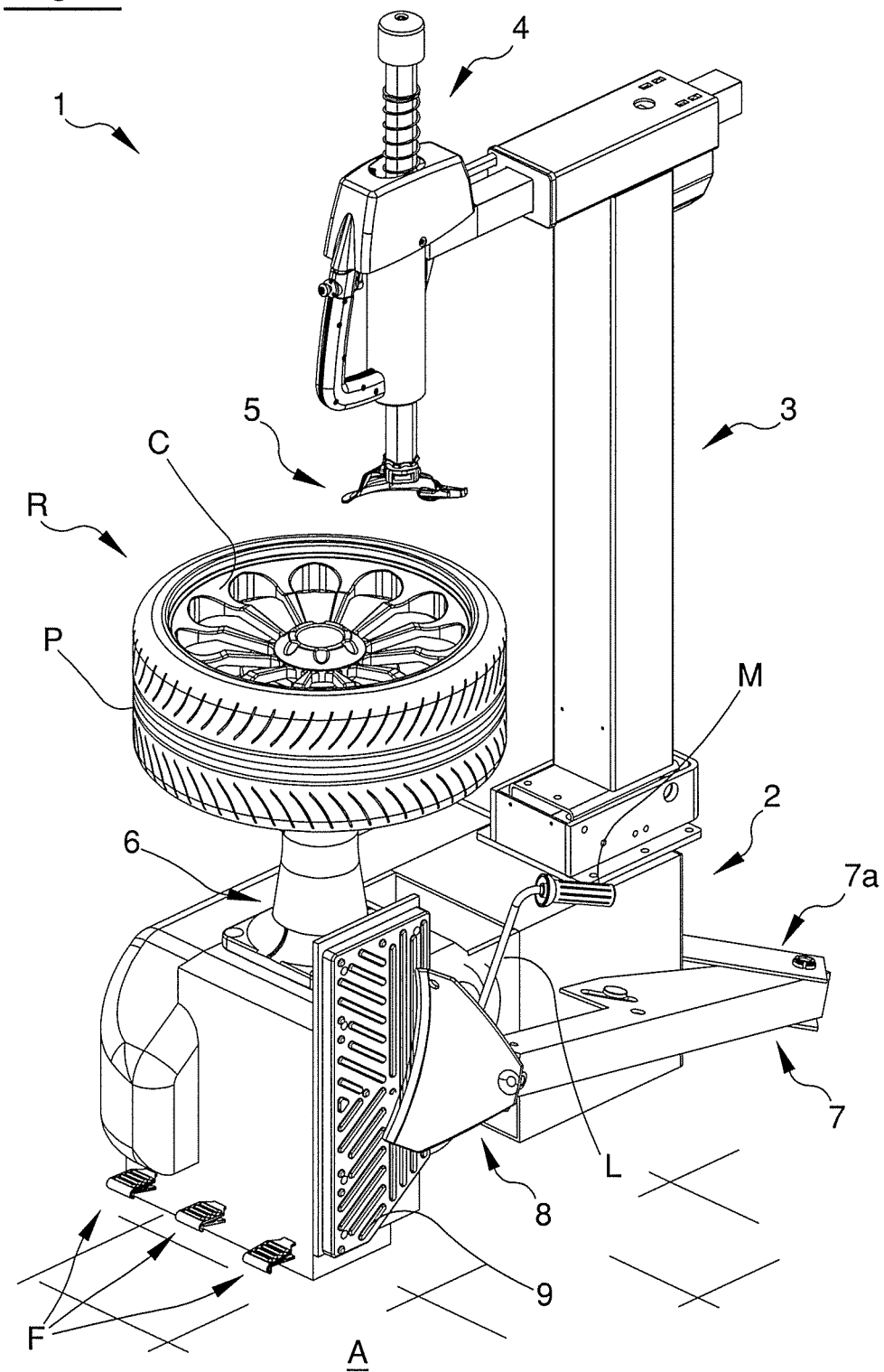
FIG. 1 shows a schematic axonometric view of a tyre changing machine according to the present invention, provided with a bead breaking assembly with a paddle-shaped bead breaking tool and a wheel mounted on the wheel support assembly.

With reference to FIG. 1, the tyre changing machine 1 comprises a frame 2 restable on a support surface or plane A, generally horizontal.

The frame 2 of the tyre changing machine 1 supports an upright or support post 3 having a vertical extension, adapted to support means 4 for mounting/demounting a tyre P to/from a respective rim C of a wheel R. The means 4 for mounting/demounting comprise at least a mounting/demounting tool 5, of known type, for example having a lever, hook or the like. The mounting/demounting means 4 can further comprise a plurality of accessories, also of known type, for example a bead presser or the like, not shown in the figures.

The tyre changing machine 1 illustrated in FIG. 1 further comprises a wheel support assembly 6, mounted vertically on the frame 2, for locking and rotating a rim C of a wheel R about a central axis thereof.

Such assembly 6 can be of various types, for example it can comprise a rotating plate provided with grips for hooking the rim C at the annular containing flanges thereof, or, as in the illustrated case in the figures, can be designed to lock the rim C at the central hole thereof, using appropriate locking means.

A bead breaking arm 7 having a substantially horizontal longitudinal extension is associated, normally hinged to the frame 2 of the machine 1, about a rotation axis that is substantially vertical, at a first end thereof. The associating of the bead breaking arm 7 to the frame can be done directly or indirectly by means of, for example, an intermediate arm 7a, which can be solidly constrained to the frame 2 or associated movably with respect to the frame 2, for example, but not necessarily, hinged to the frame.

The bead breaking arm 7 illustrated in FIG. 1 has a longitudinal extension that is substantially horizontal, though inclined by a few degrees upwards, so as to facilitate the bead breaking operations for wheels having large dimensions. By bead breaking arms having a longitudinal extension that is substantially horizontal are meant bead breaking arms having a longitudinal horizontal or inclined extension, in general though not necessarily upwards (i.e. on the opposite side with respect to the rest plane of the tyre changing machine), by a few degrees with respect to the horizontal plane, for example inclined by 25° with respect to the horizontal plane, preferably up to 15°. It is however possible, within the scope of the present invention, to have inclinations of the bead breaking arm that are different from those mentioned here purely by way of non-limiting example.

The bead breaking arm 7, at a second end thereof, is provided with a bead breaking tool 8, for example having a blade shape, a paddle shape, a rotating disc shape, a roller shape or another shape. The bead breaking tool 8 interacts with the beads of the tyre P to carry out the bead breaking operation, i.e. for detaching said beads from the rim C, before the following actual demounting. In reference to FIG. 3, the bead breaking arm 7 is movable between a disengaged position, in which said bead breaking tool 8 is substantially distanced from the frame 2 and therefore with respect to the tyre P of the wheel R to be debeaded, and a working position, wherein said bead breaking tool 8 is closer to the frame 2 of the tyre changing machine 1, as illustrated in FIG. 4, and therefore can potentially engage on said tyre P. In regard to this, a substantially vertical opposing surface 9 is mounted on the frame 2 of the bead breaking tool 8 at the area of action of the tyre changing machine 1, against which opposing surface 9, in use, the wheel R is arranged with the tyre P to be debeaded, also vertically, i.e. with the central axis thereof arranged horizontally. The opposing surface 9 is adapted to cooperate with the bead breaking tool 8 so as to carry out the bead breaking operation of the tyre P. This opposing surface 9 is knurled so as to increase the coefficient of friction with the wheel R placed against it.

The tyre changing machine 1 has one or more control pedals F for managing the functions thereof, for example for setting the support assembly 6 in rotation, for locking and/or for freeing the wheel on/from the support assembly 6, so as to activate the bead breaking arm 7, etc.

The tyre changing machine 1 is provided with an electric motor 10, provided with an output drive shaft 10a.

The electric motor 10 is used for transmitting drive to the wheel support assembly 6, generally for activating at least the rotation. In some cases, and with appropriate support assemblies, for example as illustrated in patent publication EP-A1-2639566, the electric motor 10 is adapted, in addition to setting the support assembly and possibly a rim mounted thereon in rotation, to activate the locking and/or release of the rim on/from the support assembly.

Figure 2:
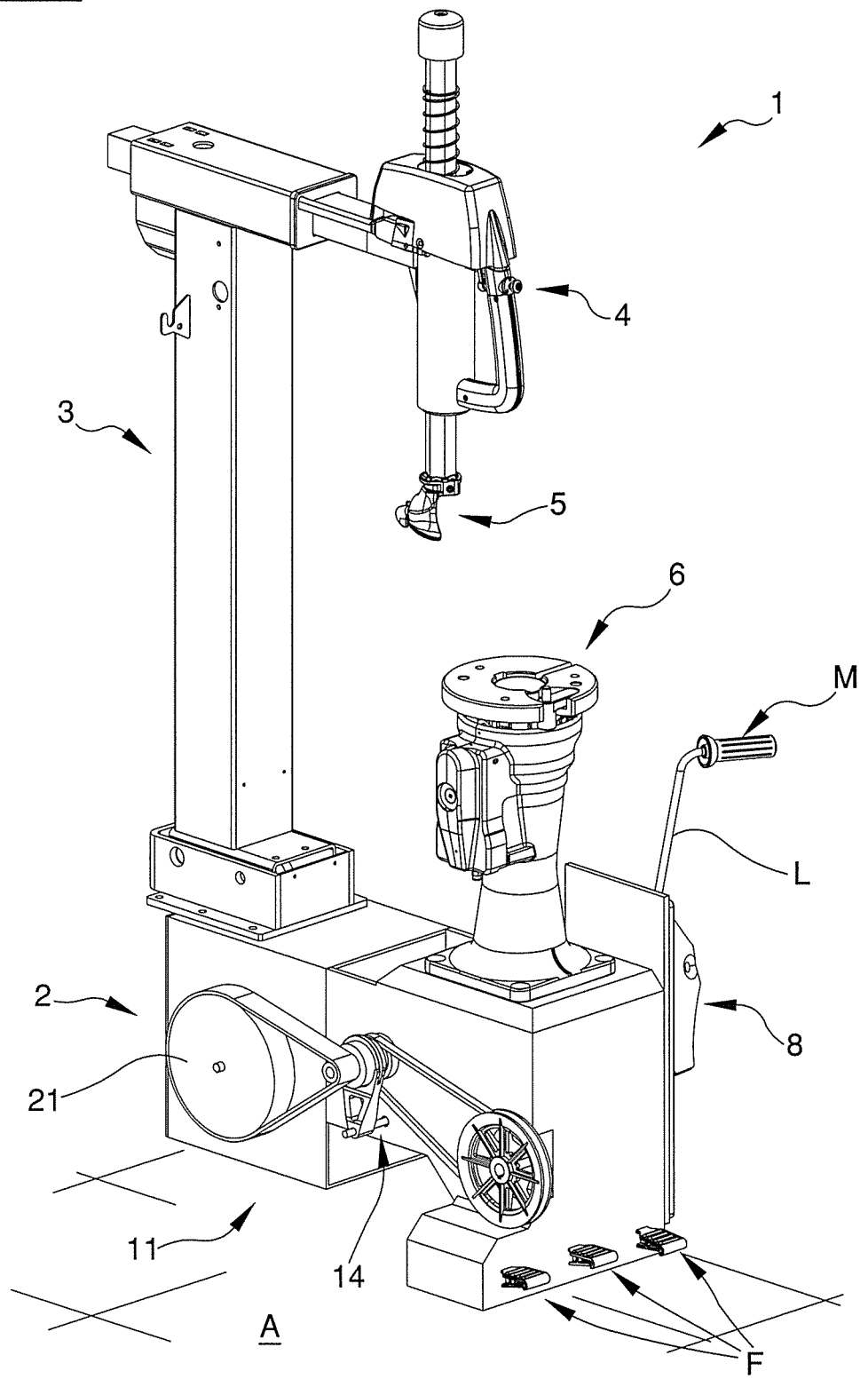
FIG. 2 illustrates the machine of FIG. 1, in an axonometric view but on an opposite side and with the lateral casing partly removed.
Figure 5:
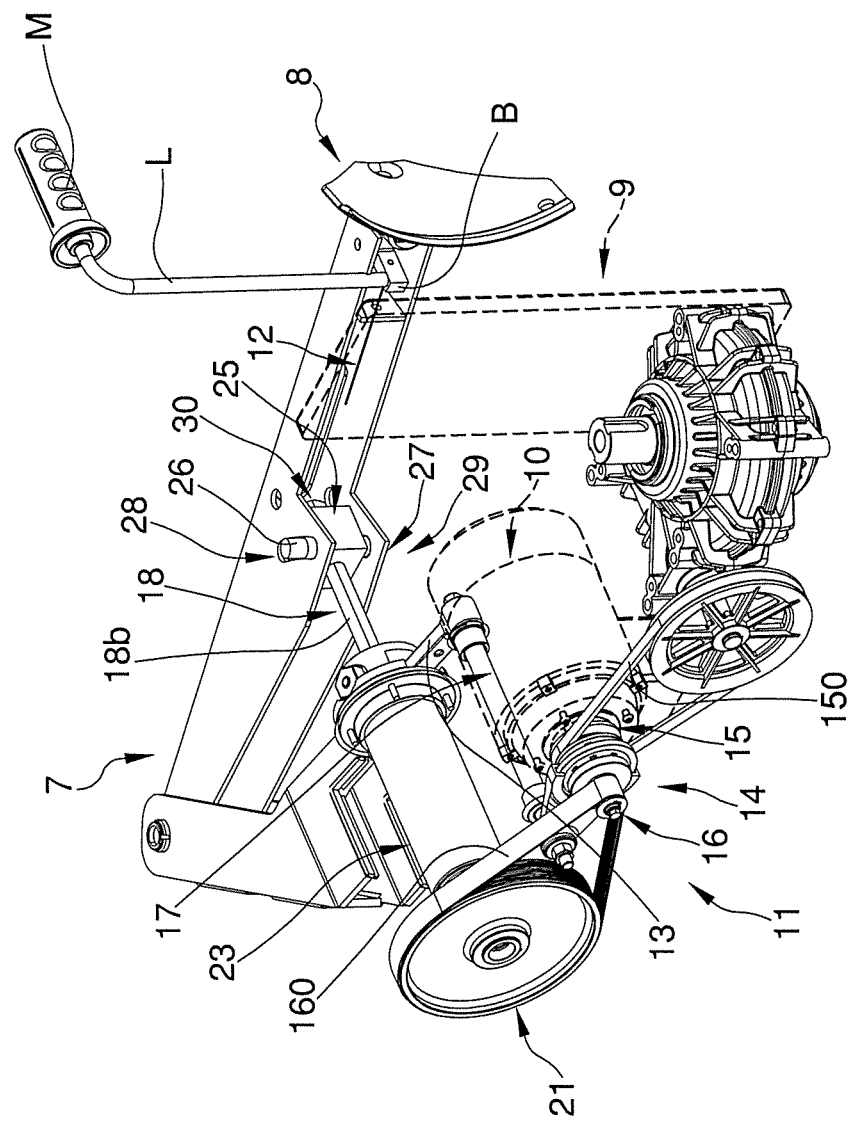
FIG. 5 is an axonometric view of a bead breaking assembly according to the present invention.

In a preferred embodiment of the present invention, illustrated in FIG. 2, and in FIG. 5, the tyre changing machine 1 of the present invention has a single electric motor 10 for moving both the bead breaking arm 7 and the wheel support assembly 6. According to this embodiment, it is also present a means 11 for selectively transmitting the drive 11 from the electric motor 10 to the bead breaking arm 7 or to the wheel support assembly 6. Said means 11 can be activated by an operator, who can therefore choose, time by time, whether to use the electric motor 10 for activating the wheel support assembly 6 or the bead breaking arm 7.

The bead breaking arm 7 can be provided, preferably in proximity of the bead breaking tool 8, with a control lever L. Said control lever L can advantageously control the electric motor 10 for activating the movement of the bead breaking arm as well as, eventually, in the context of the present preferred embodiment, also for controlling a drive selector device, as illustrated in the following.

In FIG. 5, a part of the means 11 for selectively transmitting the drive from the electric motor 10 to the bead breaking arm 7 or to the wheel support assembly 6 is illustrated in greater detail. The electric motor 10 is provided with a drive shaft 10a (FIGS. 7c and 8c) on which a drive selector device 14 is mounted, and a first pulley 15 is mounted idle on the drive shaft 10a and is adapted to transmit the drive to the wheel support assembly 6; a second pulley 16 is also mounted idle on the drive shaft and is adapted to transmit drive to the bead breaking arm 7 of the bead breaking assembly associated to the tyre changing machine.

Both the pulleys are supported on the drive shaft 10*a* by appropriate support elements, for example bearings, and retained in the seating by retaining means.

A drive selector device 14 can be removably coupled to the first 15 or the second 16 pulley.

Said removable coupling is preferably made in the following way.

The drive selector device 14 comprises a selector element, preferably having a circular crown shape, which is mounted on the drive shaft 10*a* by a woodruff key coupling, i.e. with the use of grooved profiles. In this way, apart from a modicum of play, the drive selector device 14 cannot move radially with respect to the axis of the drive shaft 10*a*, however it is free to slide axially thereon. The selector element is moved by a control device, preferably fork-shaped, coupled to the selector element at a peripheral annular portion thereof, and is adapted to translate it axially along the drive shaft 10*a*, in order to enmesh the first 15 or second 16 pulley, according to the direction of the axial translation which is imparted thereon. The selector element can be of various types, for example having frontal enmeshing.

The coupling between the selector element and each pulley 15, 16 is therefore temporary and reversible. In fact, as mentioned, said selector element can slide axially along the drive shaft 10*a* in response to a stress received from the fork-shaped control device, which in turn is activated by appropriate control means activatable by an operator. Such means can be connected to the control lever L associated to the bead breaking arm 7, or can be connected to various control means, for example to a second control lever distinct from the first lever L, or a pedal F, a button or the like, also in combination with each other.

Figure 7A:
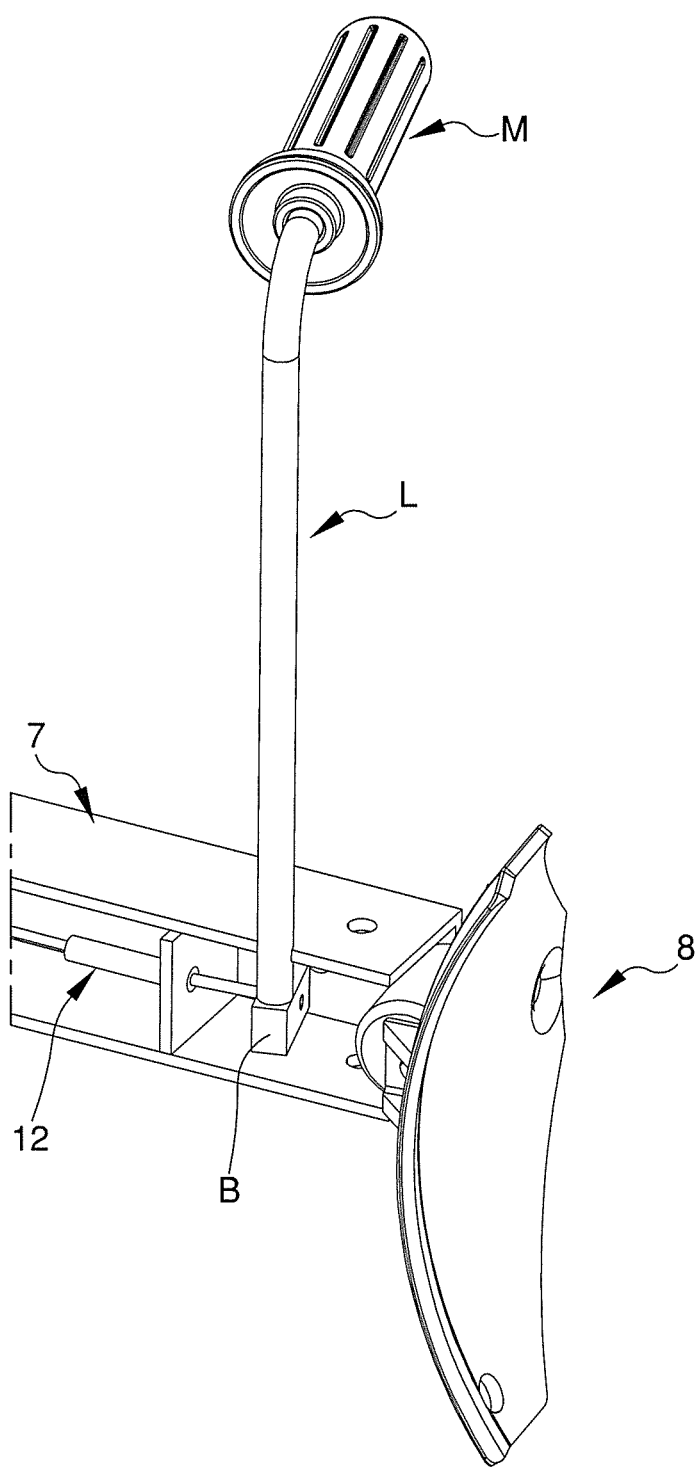
FIGS. 7a, 7b, 7c, 7d, 7e illustrate constructional details and views by way of example of the bead breaking assembly of the present invention, when the bead breaking arm is in the decoupled configuration from the motor device and in the disengaged position.
Figure 7B:
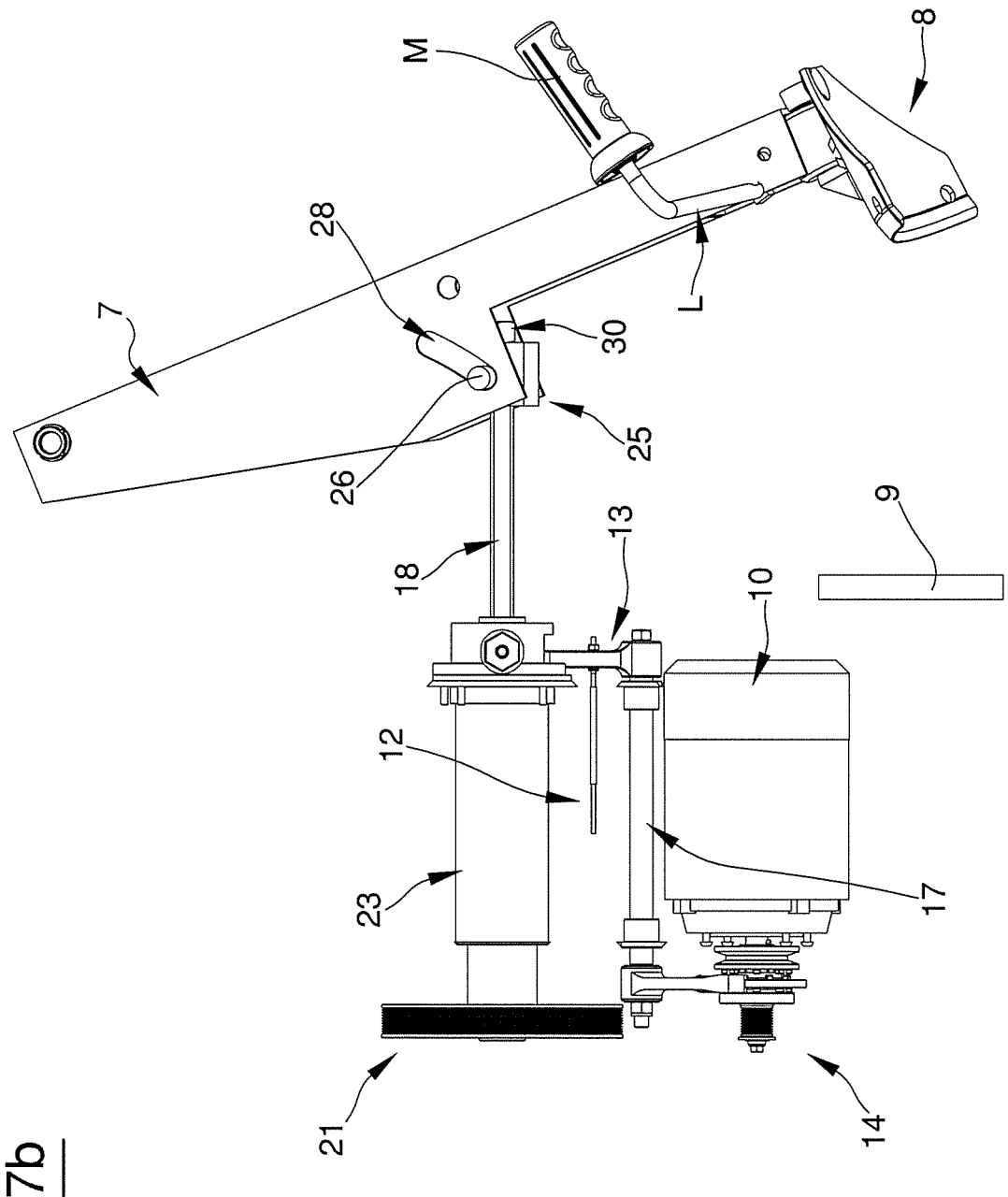
Figure 7C:
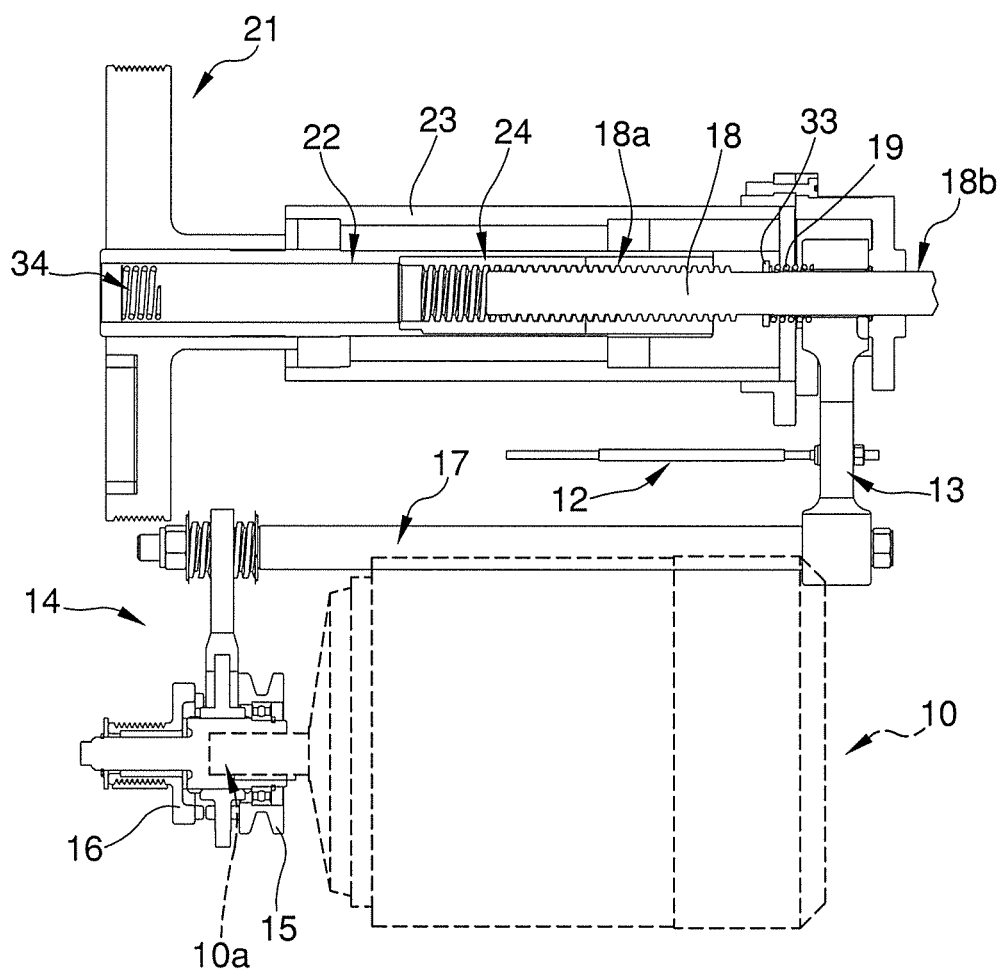
Figure 7D:
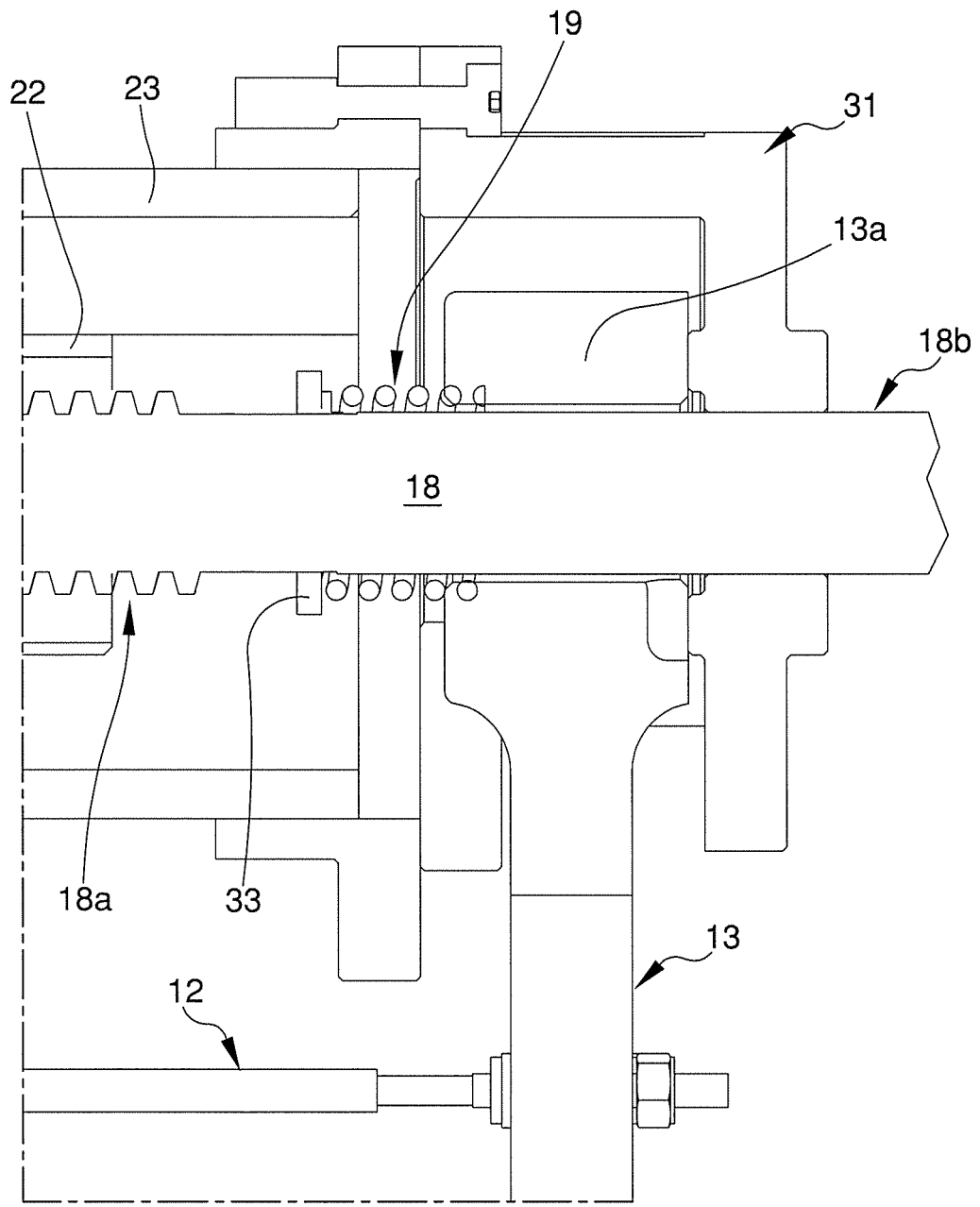
Figure 7E:
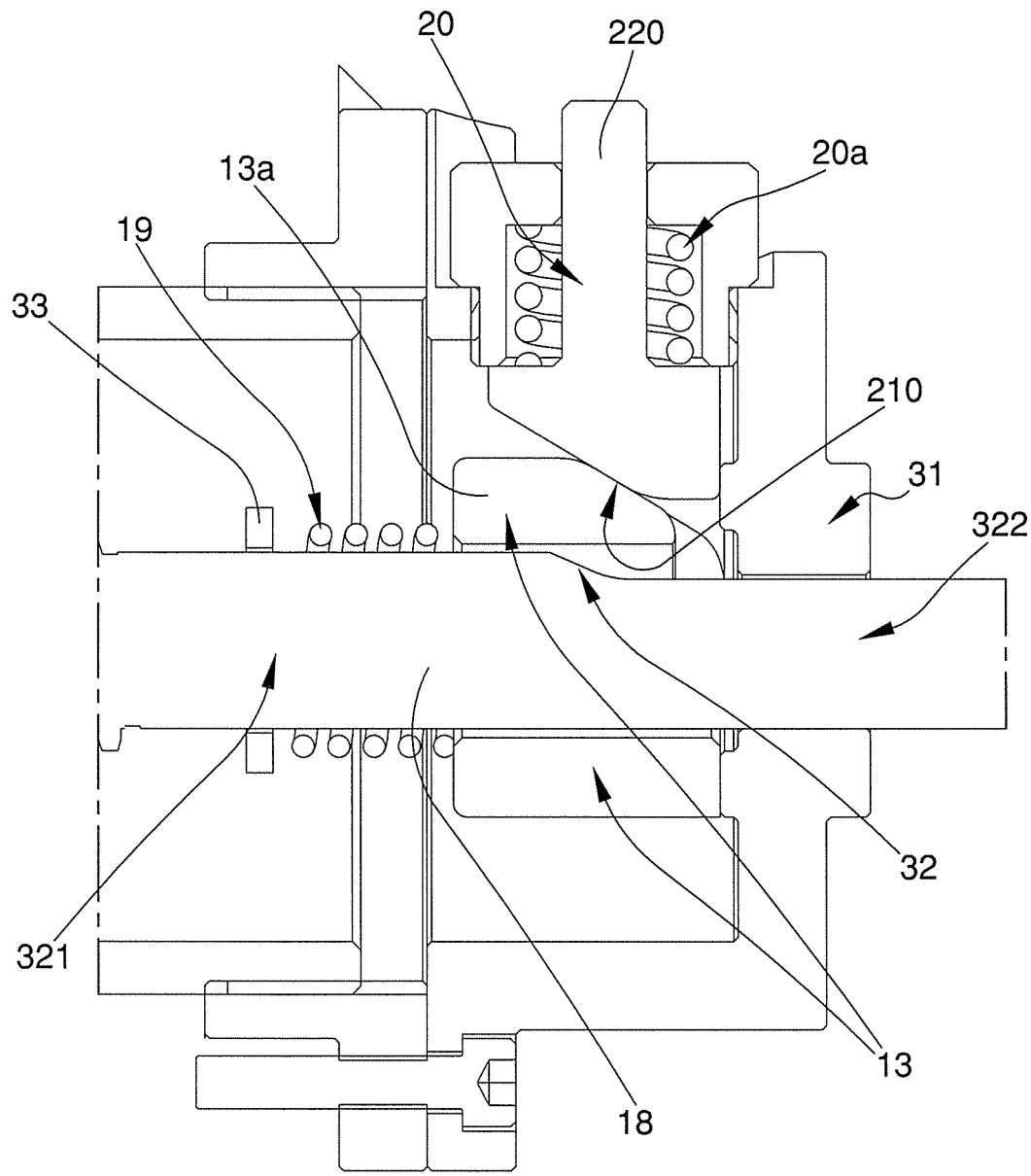
Figure 8A:
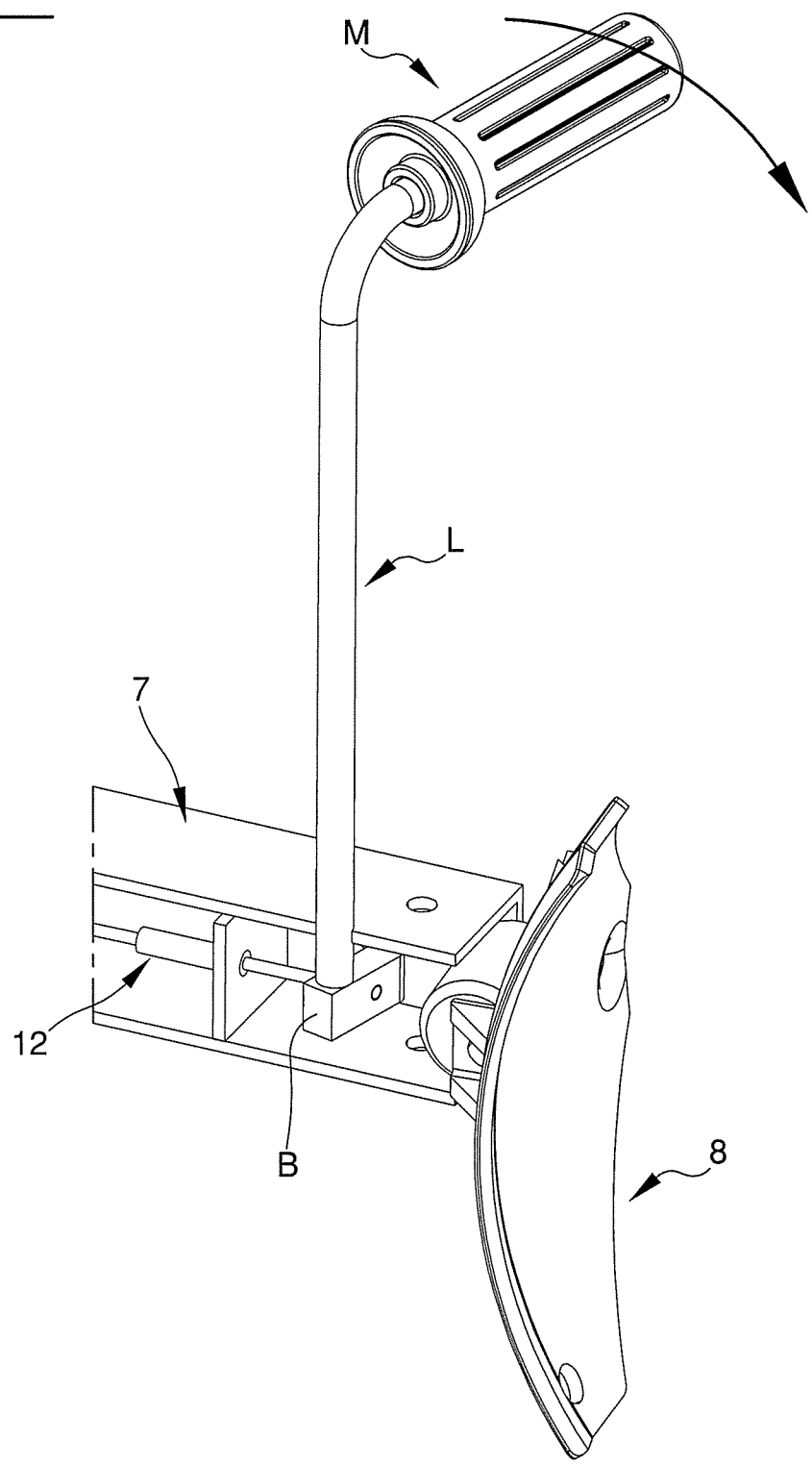
FIGS. 8a, 8b, 8c, 8d, 8e illustrate constructional details and views by way of example of the bead breaking assembly of the present invention, when the bead breaking arm is in the coupled configuration to the motor device and in the disengaged position.
Figure 8B:
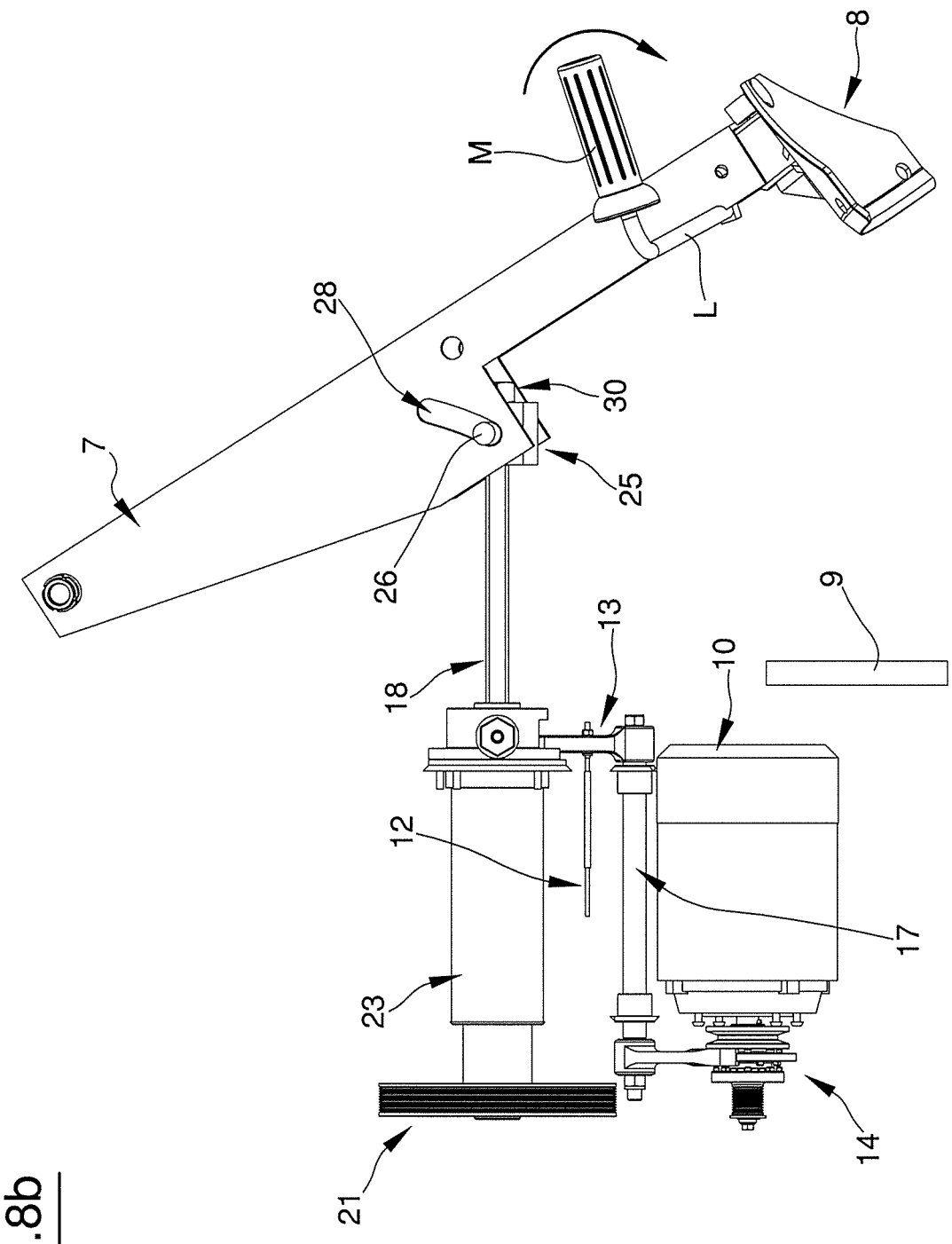

As illustrated in FIGS. 7 and 8*a*, the control means activatable by an operator can comprise a Bowden cable 12 connected to a movable block B, which can also have a cam shape, solidly constrained to the base of the lever L. By rotating the lever L in the clockwise direction, the Bowden cable 12 is pulled, which causes the decoupling of the drive selector device 14 from the first pulley 15 and the coupling thereof with the second pulley 16, so as to transmit drive to the bead breaking arm 7.

The movable block B located at the base of the lever L can also be provided with a button device, for example of the microswitch type (not illustrated in the figures) which is activated by the rotation of the block B and which can be configured so as to send a switching-on command to the electric motor 10.

The electric motor 10 can alternatively be activated by means of a button (not illustrated in the figures), for example located in proximity of the handle M of the lever L.

Once the operator has chosen, for example using the lever L, whether to use the electric motor 10 for activating the wheel support assembly 6 or the bead breaking arm 7, the transmission of drive from the first pulley 15 to the wheel support assembly 6 or from the second pulley 16 to the bead breaking arm 7 is lastly realised using appropriate transmission belts.

For example, a first belt 150 is preferably associated to the first pulley 15, which preferably has a trapezoidal shape, while a second belt 160 is preferably associated to the second pulley 16, preferably of a Poly-V type.

With reference to FIG. 5, the Bowden cable 12 operatively connects the lever L to a control and stop element 13 having a shape of a connecting bracket, which is mounted at a first end of a control rod 17 connected at a second end thereof to the drive selector device 14.

In this way, by acting on the lever L the control and stop element 13 displaces, which in turn displaces the drive selector device via the control rod 17.

Figure 6:
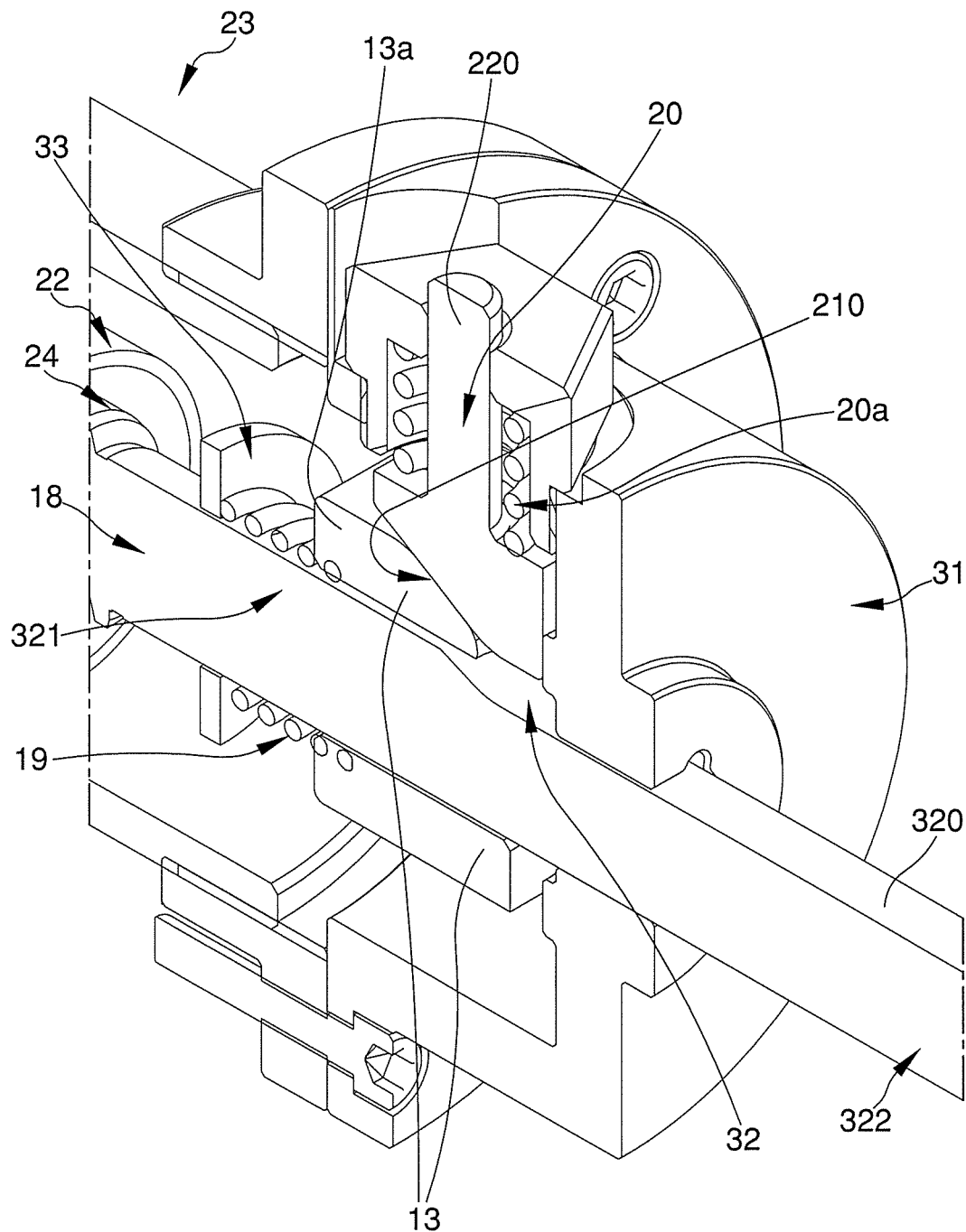
FIG. 6 is an axonometric view of section of a detail of the bead breaking assembly according to the present invention.

The control and stop element 13 is in turn connected to the means for transmitting drive from the electric motor 10 to the bead breaking arm 7, as illustrated in FIG. 6. The terminal part of the control and stop element 13 has a sleeve shape and extends about the rod element 18, where it is subjected to the action of the helical spring 19, associated to the rod element, and a pusher element 20, advantageously preloaded by elastic means 20*a*.

The pusher element 20 further comprises an abutment surface 210 and a stem 220.

The means for transmitting drive from the electric motor 10 to the bead breaking arm 7 comprise a pulley 21 mounted solidly to the tubular body 22 (FIGS. 7*c* and 8*c*), which is supported by means of appropriate bearings, for example of a type having conical rollers, by a support tube 23 solidal to the frame 2 of the tyre changing machine 1.

The pulley 21 can be made in a single piece, for example by die casting, together with the tubular body 22, which single element can include appropriate abutments for blocking the support bearings in position.

The pulley 21 can however be simply mounted solidly to the tubular body 22, for example by means of a keyed coupling or the like.

The pulley 21 is set in rotation by the second transmission belt 160, preferably, even if not necessarily of the Poly-V type, associated to the second pulley 16, which is mounted on the drive shaft 10*a*. The rotation of the second pulley 16 then sets in rotation the pulley 21 and therefore also the tubular body 22.

The tubular body 22 is internally hollow, and comprises at least a nut screw-shaped portion. The nut screw-shaped portion can be made with an endless screw 24 solidly fixed to the tubular body.

The endless screw 24 is operatively coupled with a screw-shaped manoeuvring portion 18*a* of the rod element 18. The screw-shaped manoeuvring portion 18*a* is preferably of the trapezoidal screw type, and consequently the endless screw 24 is preferably of the trapezoidal type.

The rotation of the tubular body 22 and of the endless screw 24 therefore set the rod element 18 in movement, which slides axially, in screwing and/or unscrewing direction, at least partially within the tubular body 22.

In the axial movement thereof, the rod element 18, while remaining operatively connected to the endless screw 24, will generally be adapted at least partially to exit from the tubular body 22, so as to engage appropriate connecting means 25 (FIGS. 3, 4, 7*b*, 8*b*) associated to the bead breaking arm 7.

Figure 8C:
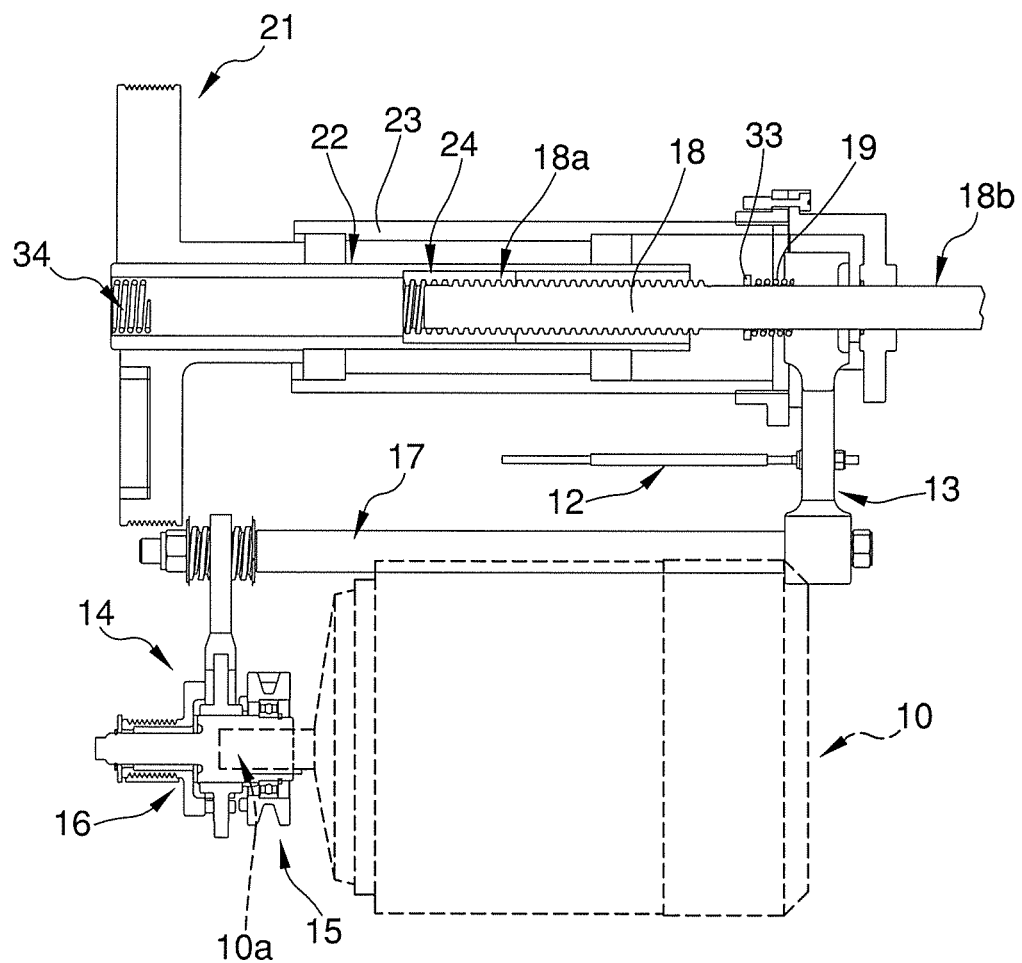

The rod element 18 further comprises a second portion 18*b*, for example, but not necessarily, having an at least partially circular section, which is preferably smooth, i.e. does not have threads (FIGS. 7*c* and 8*c*).

The tube 23 is provided with a flange 31 which, in addition to supporting the pusher element 20, interacts with the smooth portion 18*b* of the rod element 18, thus preventing an eventual rotation thereof and ensuring a movement of a purely translational type. The interaction of the flange 31 with the smooth portion 18*b* of the rod element 18 occurs by virtue of a shoulder 32 fashioned on the smooth portion 18*b* of the rod element 18 (FIGS. 7*d*, 7*e*, 8*d*, 8*e*).

The presence of the shoulder 32 therefore defines two sub-portions internally of the smooth portion 18*b* of the rod element, a first sub-portion 321, upstream of the shoulder 32, has a circular transversal section having larger diameter with respect to a second sub-portion 322, situated downstream of the shoulder. In fact, the second sub-portion 322 will generally not have a proper circular section, but rather a section defined by an arc of circumference and a segment, at which the rod element actually has a flat surface 320.

In fact, therefore, the flange 31 includes an advantageously complementarily-shaped through-hole, for enabling the second sub-portion 322 of the smooth portion 18b of the rod element 18 to engage with ease therein, with a free sliding coupling.

In reference to FIG. 6, the first sub-portion 321 is located on the left, upstream of the shoulder 32, while the second sub-portion 322 is located on the right, i.e. downstream of the shoulder 32. The rod element exhibits at least the flat surface 320 at least at the second sub-portion 322.

A washer 33, mounted on the rod element 18, protects the threaded portion 18a thereof from any eventual contact with the helical spring 19. The washer 33 can be mounted freely slidably on the rod element 18. In this case, it will be dimensioned in such a way as never to come into contact with the threaded portion 18a of the rod element 18, for example the washer 33 might have a larger diameter than the tubular body 22.

Alternatively, the washer 33 might be mounted fixed on the rod element 18. As a further alternative, the function of protecting the threaded part 18a of the rod element 18 from a possible contact with the helical spring 19 might be carried out by an appropriate shoulder fashioned at the position of the last turn of the threaded portion 18a of the rod element 18.

Said second smooth portion 18b of the rod element 18 is preferably destined to engage in the connecting means 25, which for example comprises a sleeve-shaped element, in which the smooth portion 18b of the rod element 18 can freely slide.

The sleeve 25 preferably has a section alike to that of the second sub-portion 322 of the smooth portion 18b of the rod element.

The sleeve is provided with a first and a second pins 26, 27 destined to engage in respective slots 28, 29 fashioned on the bead breaking arm 7. The two pins 26, 27 are preferably arranged along the same vertical axis. The two slots 28, 29 are fashioned on respective surfaces solidly constrained to the bead breaking arm, a first surface located in a distal position with respect to the rest plane A, and a second surface located in a proximal position with respect to said rest plane A.

A striker element 30, for example a security nut preventing unscrewing with end-run functions, is preferably mounted to an end of the smooth portion 18b of the rod element 18 that is opposite with respect to the frame 2 of the machine 1 and in any case externally of the bead breaking arm 7 and the sleeve 25.

The movement of the bead breaking arm 7 of the present invention can operatively take place according to the steps described in the following.

Figure 3:
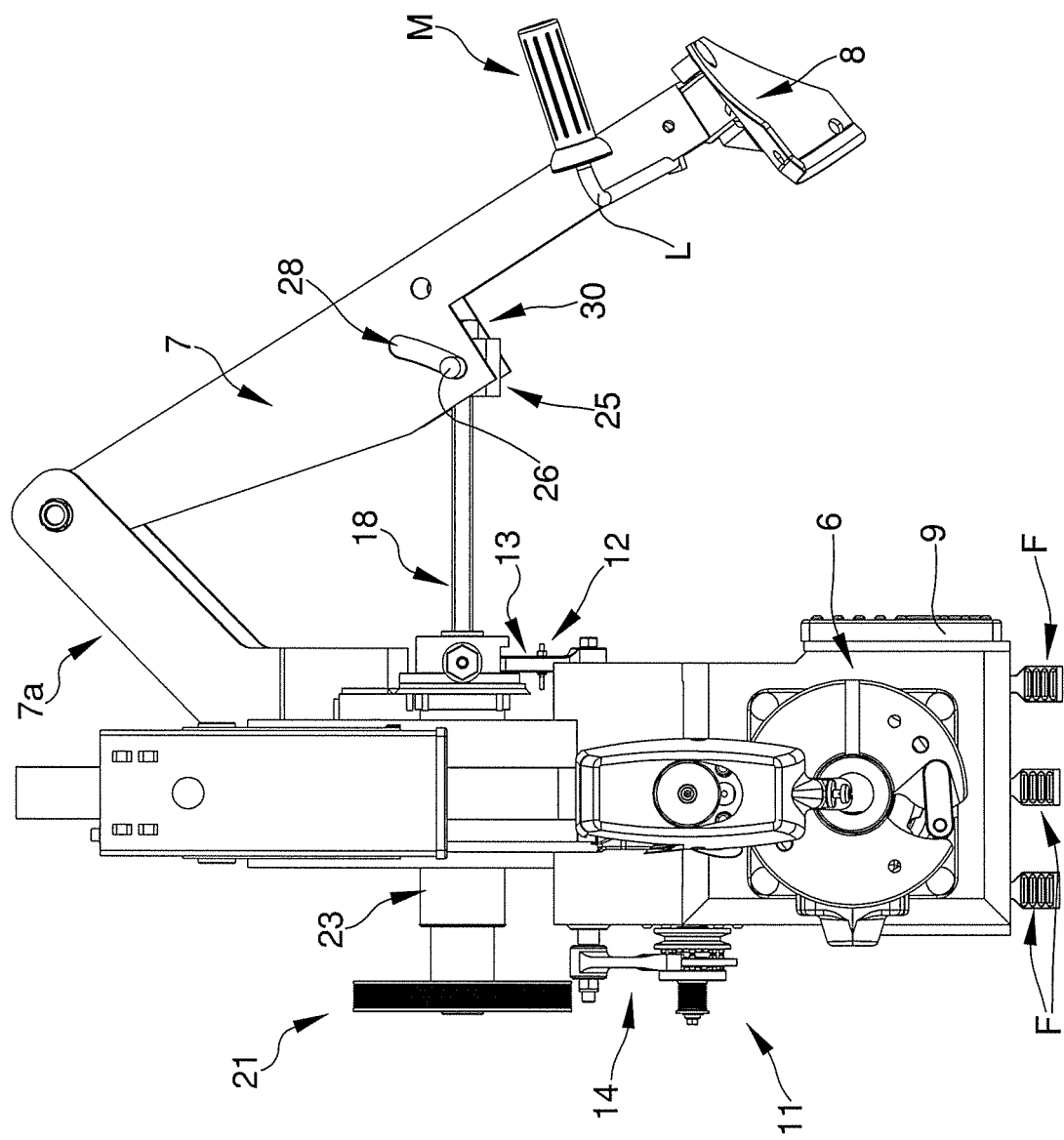
FIG. 3 illustrates a tyre changing machine according to the present invention, in a view from above and with lateral casings partially removed, in the configuration in which the bead breaking arm is in the disengaged position, i.e. distanced from the machine frame.
Figure 4:
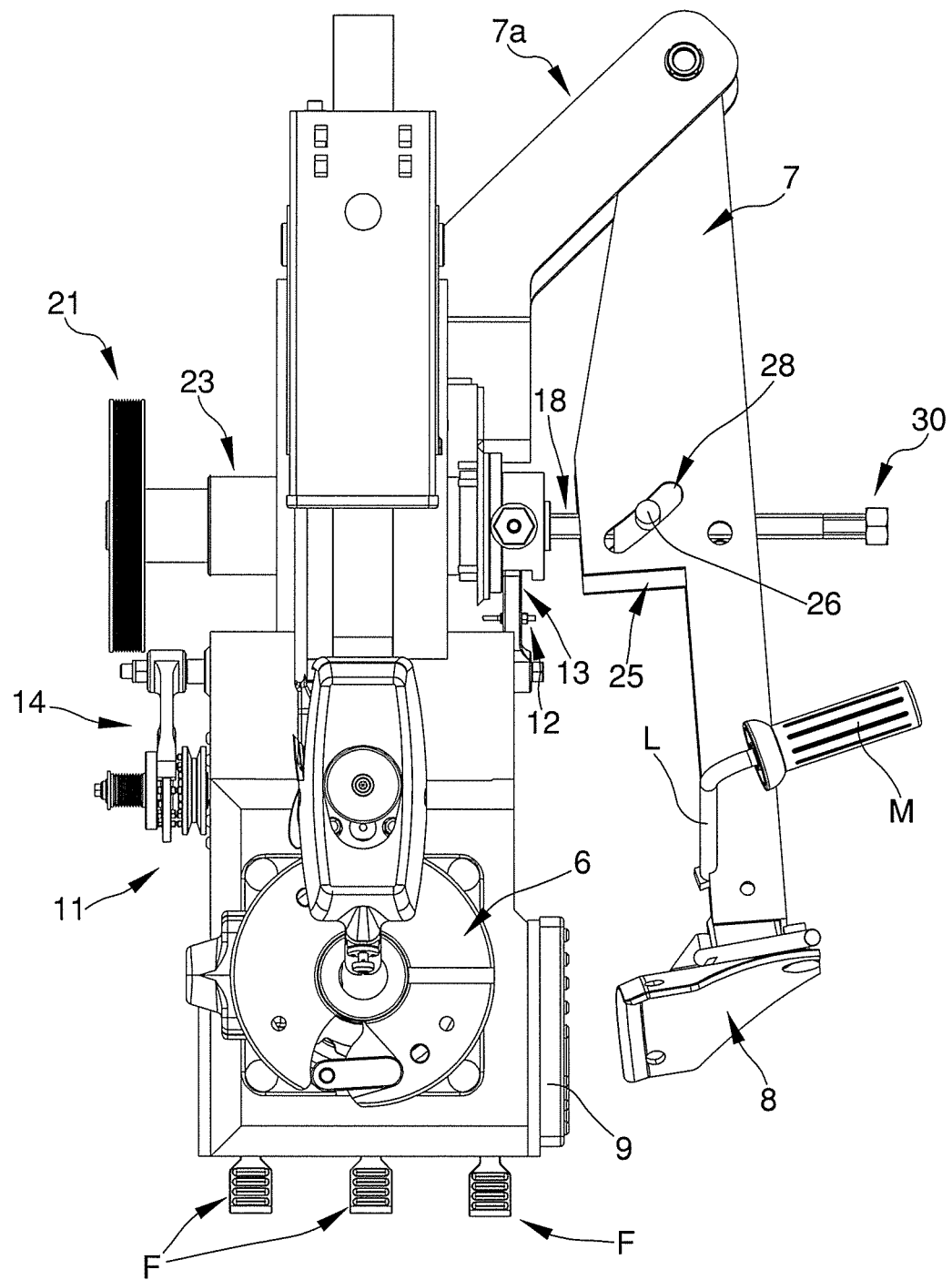
FIG. 4 illustrates the tyre changing machine of FIG. 3, with the bead breaking arm in the working position, i.e. neared to the machine frame.

At first, the bead breaking arm 7 is in a disengaged position, i.e. in a position of maximum distance from the frame 2 of the tyre changing machine 1, as illustrated in FIGS. 3 and 7b.

In this position, the rod element 18 is in the completely open position, i.e. the position of maximum extension towards the outside of the tubular body 22, and the nut 30 is positioned in abutment with the sleeve 25.

The effective opening of the bead breaking arm 7 will be decided as the operator desires, according to the size of the wheel R to be worked on.

The lever L is in the rest position (FIG. 7a), and the Bowden cable 12 is not tensioned.

The drive selector device 14 engages the first pulley 15 (FIG. 7c).

The control and stop element 13 is maintained in a rest position (FIGS. 7d and 7e) by the helical spring 19, which overcomes the force exerted by the pusher element 20 via the abutment surface 210, due to the preload of the spring 20a.

In this configuration the upper portion 13a of the control and stop element 13 is in a distanced position with respect to the rod element 18.

With reference to FIG. 8a, when the operator rotates the handle M of the lever L in the clockwise direction, the Bowden cable 12 is tensioned, i.e. pulled, along the longitudinal axis of the bead breaking arm 7, towards the bead breaking tool 8, thanks to the action of the movable block B.

At the same time at the moment that the handle M is rotated, as illustrated in FIG. 8a, the movable block B activates a button of the microswitch type (not illustrated) which sends a switching-on command to the electric motor 10.

With reference to FIG. 8c, the control and stop element 13 is displaced by the action of the Bowden cable 12 towards the left, i.e. towards the position of the endless screw 24. The control rod 17 will also be subject to a displacement towards the left (still with reference to FIG. 8c), bringing the drive selector device 14 to decouple from the first pulley 15 and enmesh on the second pulley 16, so that the electric motor 10 can transmit the drive, via the second belt 160, to the pulley 21 associated to the bead breaking arm. Said pulley 21 sets the tubular body 22 and therefore the endless screw 24 in rotation which, in turn, imparts an axial translational motion, in a screwing direction, on the rod element 18, which, by sliding freely internally of the sleeve 25, will begin to return internally of the tubular body 22, gradually leaving the initial position of maximum opening, illustrated in FIG. 8b.

By the action of the nut 30 on the sleeve 25 or directly on the bead breaking arm 7, the traction force will be transmitted from the rod element 18 to the bead breaking arm 7, which will therefore begin to gradually move towards the frame 2 of the tyre changing machine 2.

Figure 8D:
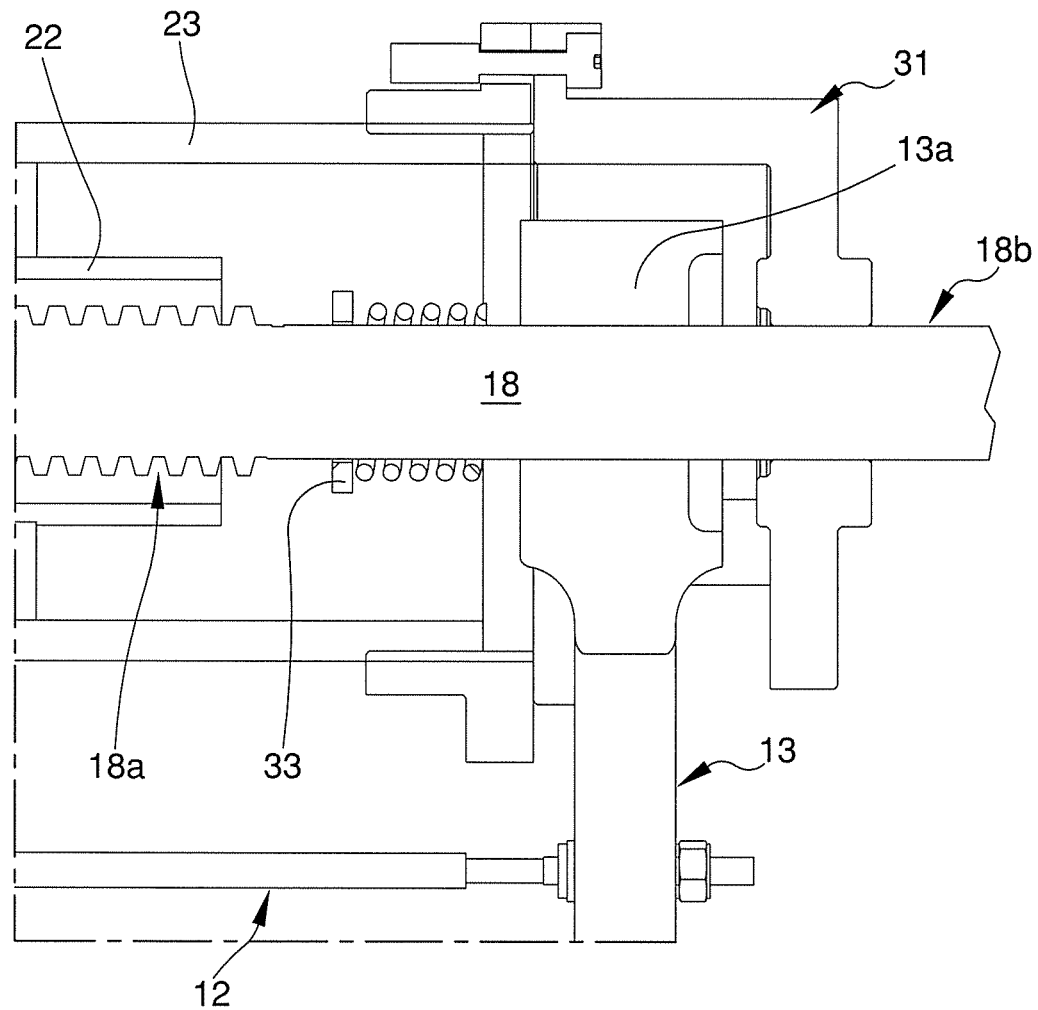
Figure 8E:
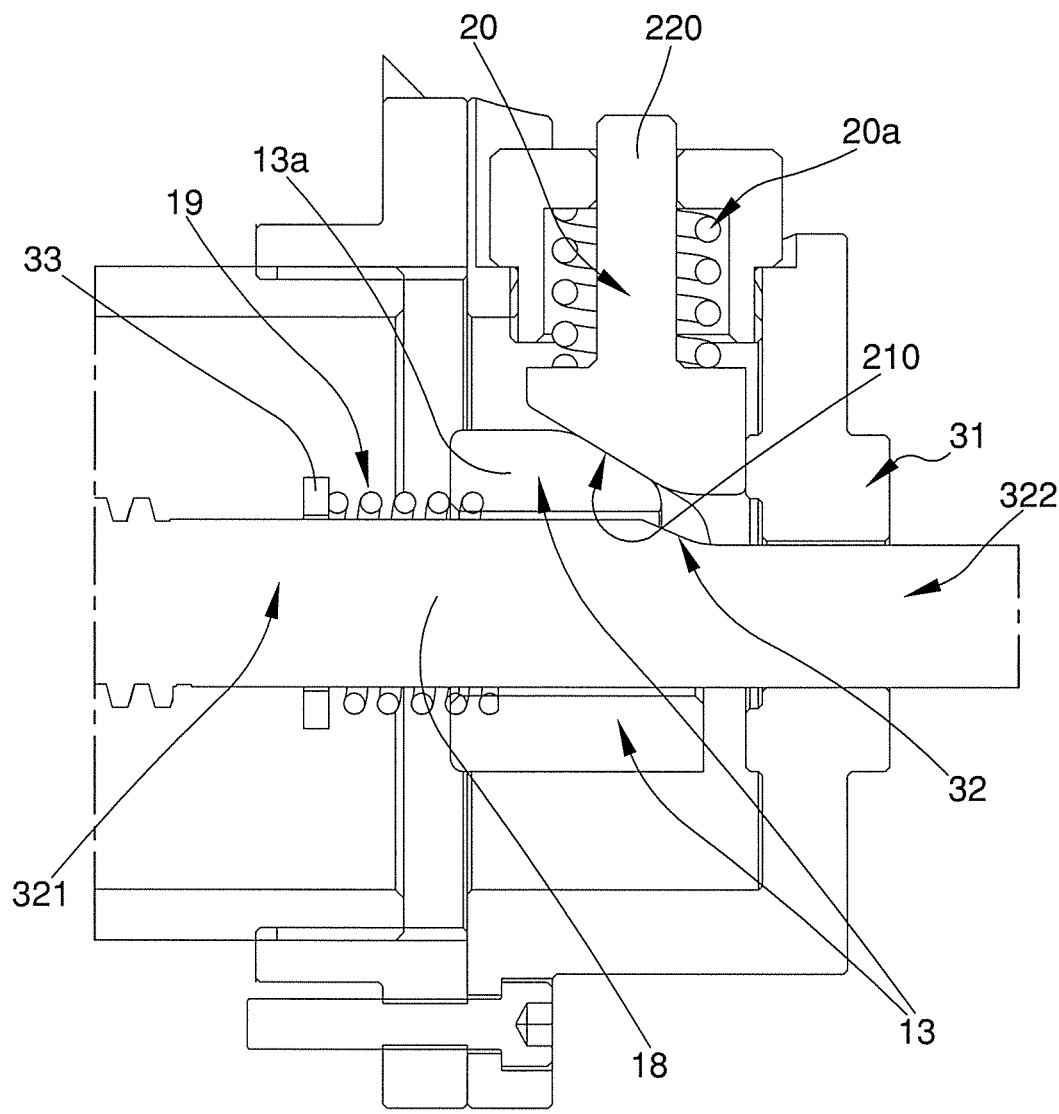

With reference to FIGS. 8d and 8e, the control and stop element 13 also starts moving towards the left i.e. towards the endless screw 24, overcoming the resistant force of the helical spring 19, in doing this making use of the contribution of the pusher element 20, preloaded by the spring 20a. The upper portion 13a of the control and stop element 13 begins to lower, pushed by the abutment surface 210 of the pusher element 20, and thus nears the rod element 18.

Figure 8F:
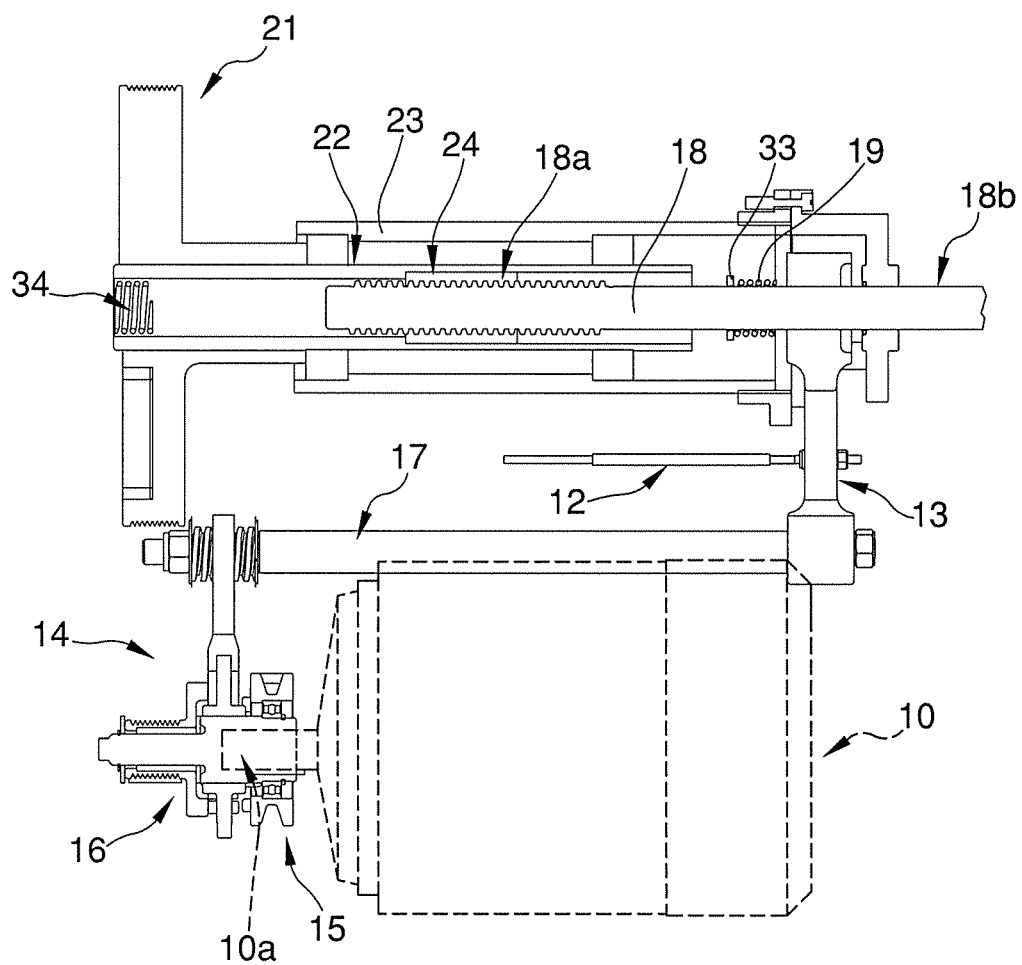
FIG. 8f is a partially sectioned view of a constructional detail of the bead breaking assembly of the present invention, when the bead breaking arm is in the coupled configuration to the motor device and in an intermediate position between the disengaged position and the working position.

With reference to FIG. 8f, an intermediate position of the rod element 18 is illustrated, i.e. a position partially retracted internally of the tubular body 22. The force of the helical spring 19 has been completely overcome and the spring can also be in a distal position with respect to the control and stop element 13, which in turn will be newly neared to the rod element, up to reaching an operating position; the upper portion 13a of the control and stop element 13 is at a lower height than the external diameter of the first sub-portion 321 of the smooth portion 18b of the rod element, though without coming into contact therewith. This is possible because in the configuration illustrated in FIG. 8f, the shoulder 32 (not visible in the figure) fashioned on the rod element 18 is now on the left with respect to the control and stop element 13, which thus directly faces, though without coming into contact therewith, on the second sub-portion 322 of the smooth portion 18b of the rod element 18, i.e. at the flat surface 320.

Figure 9A:
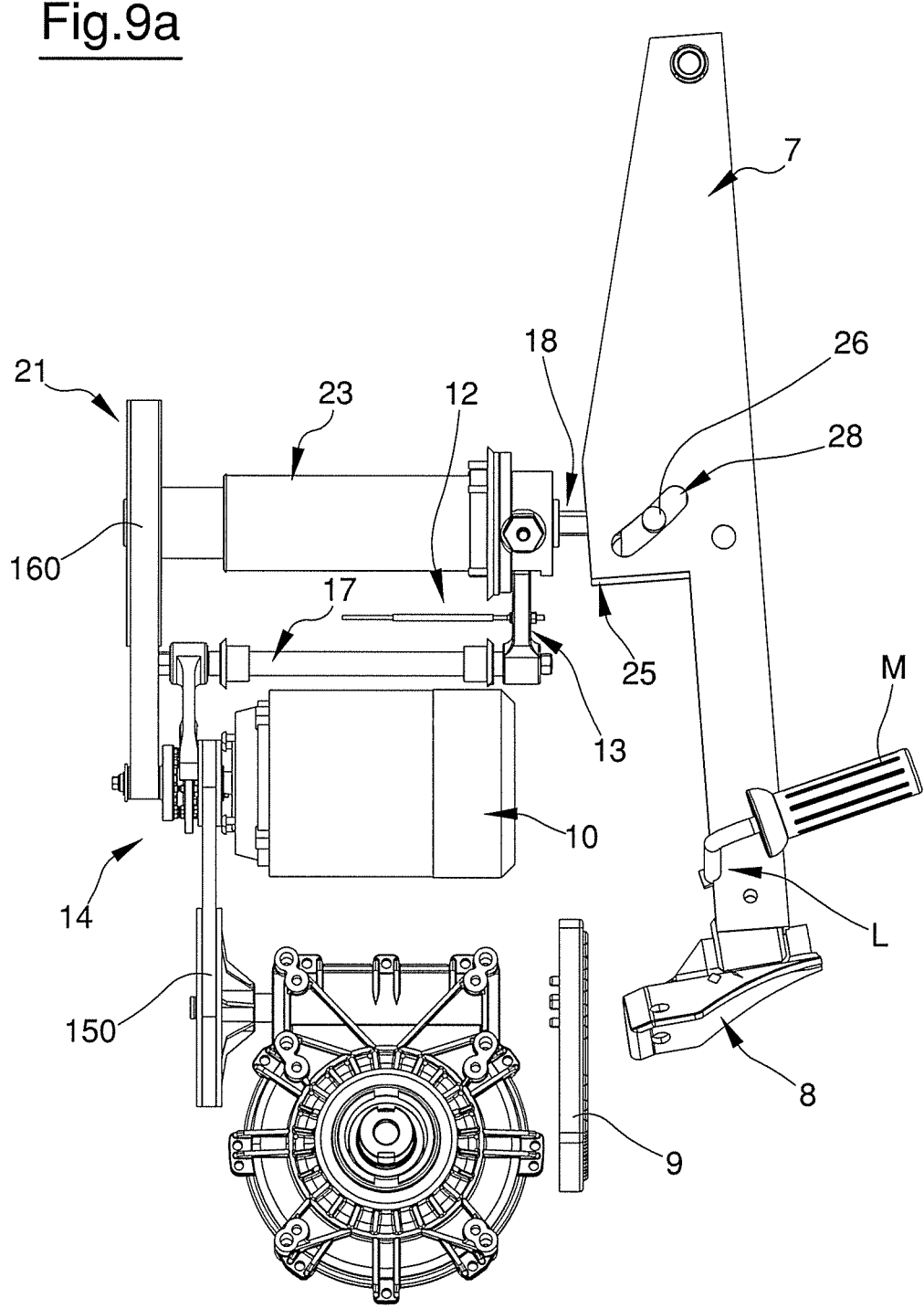
FIGS. 9a, 9b, 9c illustrate constructional details and views by way of example of the bead breaking assembly of the present invention, when the bead breaking arm is in the coupled configuration to the motor device and in the working position.
Figure 9B:
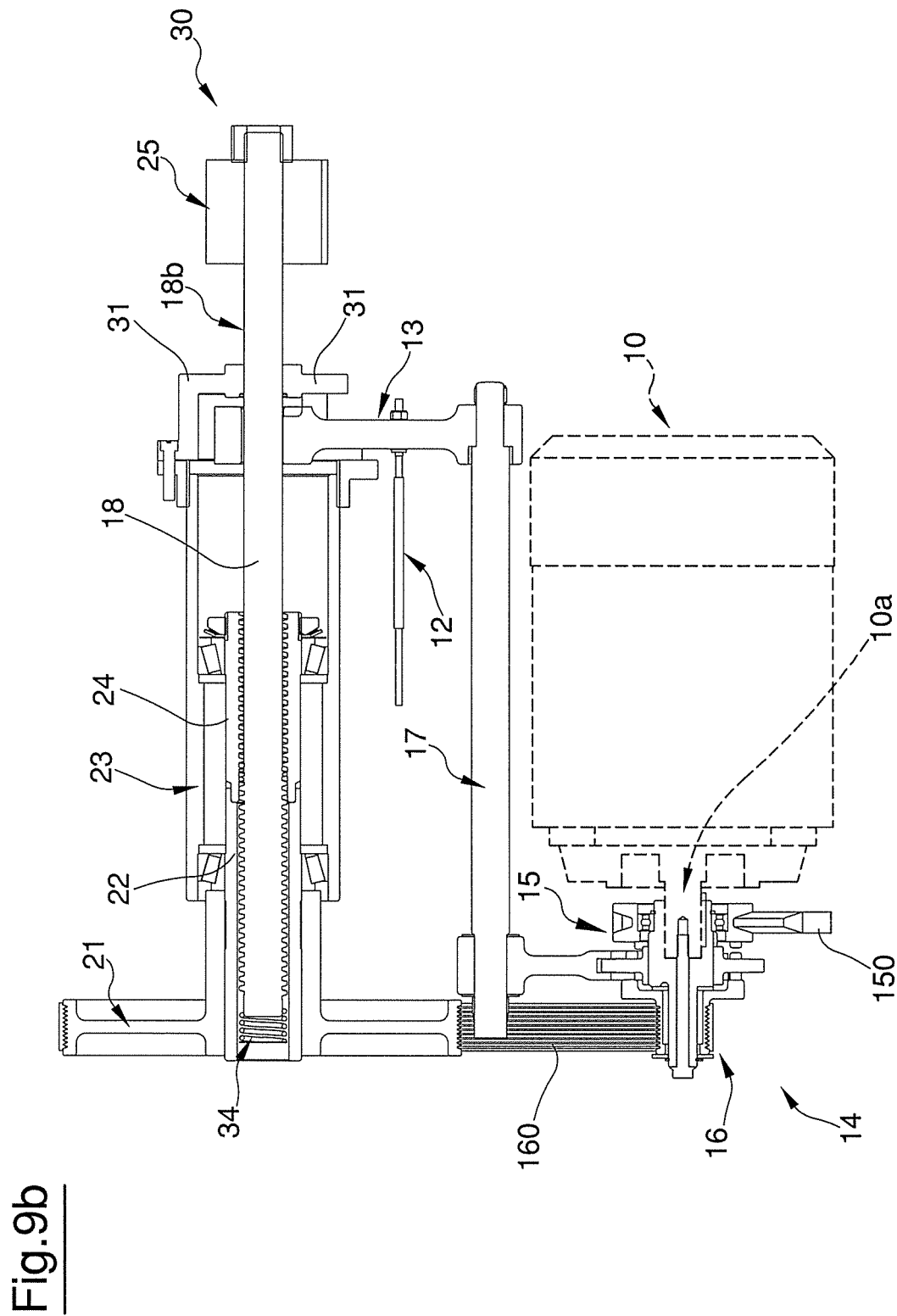

With reference to FIG. 9a, the bead breaking arm 7 is in the working position, with the rod element 18 in the completely closed position, i.e. substantially retracted internally of the tubular body 22 (FIG. 9b).

Figure 9C:
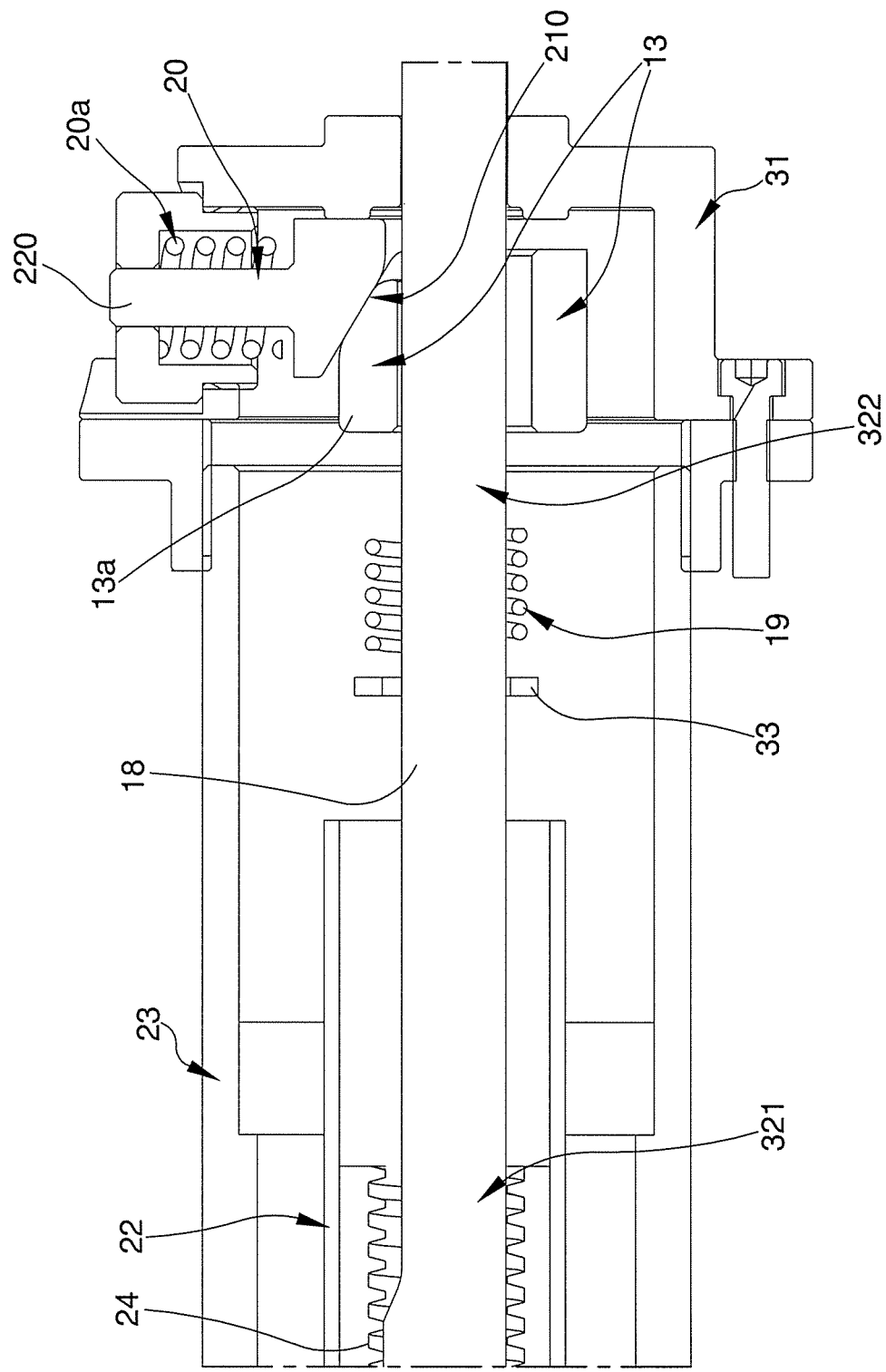

With reference to FIG. 9c, the control and stop element 13 is maintained in an operating position, i.e. completely displaced to the left in the drawing, i.e. towards the endless screw 24. In this configuration the upper portion 13a of the control and stop element 13, by action of the pusher element 20, is in a maximum neared position, i.e. in the operating position, towards the rod element 18.

In the above configuration, the bead breaking arm 7 is therefore in the working position, and the bead breaking tool 8 has already been able to engage on a tyre P and cause the detachment of at least a portion of the bead of the rim C of a wheel R previously and advantageously positioned by an operator.

In this position, the electric motor 10 continues to function, however the screw/nut coupling between the endless screw 24 and the threaded portion of the rod element 18 is such that the rod element 18 remains substantially stationary in the closed position i.e. the maximum screwed position. In a case of eventual small residual axial displacements, in every case they can be advantageously damped by appropriate elastic means 34 positioned internally of the tubular body 22, for example at the pulley 21.

The tyre changing machine 1 of the present invention can possibly be advantageously provided with an electronic control system, which can comprise a safety device adapted to switch off the electric motor 10 after a predetermined operating time, with the rod element 18 in the completely closed configuration.

Once the bead breaking of the at least a portion of bead has been obtained, the operator simply releases the handle M, which, recalled by appropriate elastic means (not illustrated), rotates in an anti-clockwise direction and returns into the initial position thereof, imparting a like movement on the movable block B solidly constrained to the lever L. This means that the Bowden cable 12 is no longer subjected to tension.

On release of the microswitch previously activated by the block B, the electric motor 10 is automatically activated by the electronic control system, setting the drive shaft 10a in rotation in the opposite direction, i.e. the unscrewing direction, with respect to the preceding screwing direction of the rod element 18 on the endless screw 24.

The enmeshing of the first threads of the screw/nut couple can be facilitated by the action of the elastic means 34.

The control and stop element 13 remains substantially in the same operating position, while the rod element 18 translates axially towards the right, i.e. towards the maximum opening position.

Any counter-rotations of the rod element 18 are prevented by the presence of the flange 31, which interacts with the second sub-portion 322 of the smooth portion 18b of the rod element. During the translation movement in the opening direction of the rod element 18, the bead breaking arm 7 is stationary in the closed position, i.e. in the proximal position with respect to the frame 2 of the tyre changing machine 1, since the nut 30 no longer engages the sleeve 25 and the rod element 18, by sliding freely internally of the sleeve 25, is no longer able to transmit any force to the bead breaking arm 7.

The operator can therefore manually open the bead breaking arm 7 as desired, using the lever L without rotating it, with the desired velocity. In this step, the nut 30 assumes a simple end-run function for the purposes of safety, in order to guarantee that the open position of the bead breaking arm 7 does not assume excessive distances from the frame 2 of the machine 1.

Clearly the travel of the rod element 18 is linked to the length of the threaded portion 18a which can be chosen as desired during the design stage, in order to guarantee full operativity of the bead breaking assembly with wheels of any dimension. In a similar way, the velocity of screwing and unscrewing of the rod element 18 on the endless screw 24 is a function of their specific size and the rotation velocity of the drive shaft 10a, as well as the dimensioning of the belt and pulley transmission system. All of these variables are preferably selected in such a way as to obtain an optimal velocity, both in terms of productivity and safety for the operator, and a safeguarding of the wheel to be worked on.

During the opening motion thereof, when the rod element 18 is close to the maximum open position, at a certain point the washer 33 again pushes the helical spring 19 against the control and stop element 13, which will be pushed to the right, and the upper portion 13a will begin to contact the pusher element 20 at the abutment surface 210. In case, the upper portion 13a might also be accompanied, during this step of returning towards the rest position, by the action of the shoulder 32 thereon.

Once the maximum opening position of the rod element 18 has been reached, the control and stop element 13 will return to the initial rest position, consequently displacing also the control rod 17 in the initial position thereof, which leads to the disengagement of the drive selector device 14 from the second pulley 16 and enmeshing thereof on the first pulley 15.

In order to prevent an unexpected and undesired rotation of the wheel support assembly 6, the stem 220 of the pusher element can be dimensioned so as to come into contact, in that working configuration, with a control device, for example of the microswitch type, for automatically controlling the switching-off of the motor on conclusion of the translational opening motion of the rod element. The microswitch device (not illustrated in the figures) can usefully be mounted solidly to the frame 2 of the tyre changing machine 1.

Once this operating cycle has concluded, the operator can therefore manually completely open the bead breaking arm 7 which, by means of the sleeve 25, is as mentioned free to slide along the rod element 18, and eventually to advantageously position the wheel R in such a way as to carry out the bead breaking operation of a further portion of bead of the tyre P.

This operation can obviously be repeated more than once, up to obtaining the complete debeading of the tyre P from the rim C.

The embodiment described above is obviously provided merely by way of non-limiting example and a person skilled in the art can obviously conceive further embodiments of the present invention, all falling within the scope of protection of the appended claims.

REFERENCE LIST 1 tyre changing machine
2 frame
3 support post
4 mounting/demounting means 5 mounting/demounting tool
A rest surface
6 wheel support assembly
R wheel
C rim
P tyre
7 bead breaking arm
7a intermediate arm
8 bead breaking tool
9 opposing surface
10 electric motor
10a output drive shaft
11 selective drive transmission means
F control pedal
L control lever
M handle of the lever
B movable block
12 Bowden cable
13 control and stop element
13 upper portion of the control and stop element
14 drive selector device
15 first pulley
16 second pulley
150 first belt
160 second belt
17 control rod
18 rod element
18a screw-shaped control portion of the rod element
18b smooth portion of the rod element
320 flat surface
321 first sub-portion of the smooth portion
322 second sub-portion of the smooth portion
19 helical spring
20 pusher element
20a preload spring
210 abutment surface
220 stem
21 pulley solidly mounted to the tubular body
22 tubular body
23 support tube
24 endless screw
25 connecting means
26, 27 pins
28, 29 slots
30 striker element
31 flange
32 shoulder fashioned on the rod element
33 washer
34 elastic means

The invention claimed is:

1. A tyre changing machine comprising
a frame restable on a rest surface;
a wheel support assembly for locking and setting a rim of a wheel in rotation from which to demount or on which to mount a respective tyre, said wheel support assembly being mounted on the frame;
a bead breaking arm having a first end connected to the frame;
a bead breaking tool connected to a second end of said bead breaking arm and able to carry out the bead breaking operation of the tyre;
the bead breaking arm being movable between a disengaged position, in which the bead breaking tool is distanced with respect to the tyre of the wheel to be debeaded, and a working position, wherein said bead breaking tool can engage on said tyre;
an electric motor having a rotating output drive shaft for moving the bead breaking arm between the disengaged position and the working position and vice versa,
means for transmitting drive from the electric motor to the bead breaking arm, said means for transmitting the drive comprising a rod element having an externally screw-threaded first portion, and a tubular body having an internally screw-threaded portion threadingly coupled with the first portion of the rod element; and
connecting means for operatively connecting the rod element to the bead breaking arm,
wherein said connecting means are adapted to slidably engage the rod element,
wherein the tubular body is operatively coupled to the rotating output drive shaft of the electric motor such that rotation of the output drive shaft causes rotation of the tubular body, to move the rod element axially relative to the tubular body and the bead breaking arm from the disengaged position to the working position and vice versa, and
wherein said means for transmitting the drive further comprise a striker element adapted to engage with at least one of the connecting means and the bead breaking arm.

2. The tyre changing machine according to claim 1, wherein the connecting means engage a non-threaded second portion of the rod element abutting the first portion of the rod element.

3. The tyre changing machine according to claim 2, wherein the connecting means comprise a sleeve-profiled element for engaging the second portion of the rod element.

4. The tyre changing machine according to claim 2, wherein the connecting means comprise an element having a grooved profile for engaging the second portion of the rod element.

5. The tyre changing machine according to claim 2, wherein the striker element is mounted on the second portion of the rod element.

6. The tyre changing machine according to claim 1, wherein the connecting means are hinged, by means of at least a pin, to the bead breaking arm.

7. The tyre changing machine according to claim 6, wherein the at least a pin is adapted to engage in a respective slot fashioned in the bead breaking arm.

8. The tyre changing machine according to claim 1, wherein the connecting means are hinged, by at least a first pin, to an intermediate connecting element, said intermediate connecting element being hinged, by means of at least a second pin, to the bead breaking arm.

9. The tyre changing machine according to claim 1, comprising means for selectively transmitting the drive from the electric motor to the bead breaking arm or to the wheel support assembly and able to selectively activate said bead breaking arm or said wheel support assembly.

10. The tyre changing machine according to claim 9, wherein the means for selectively transmitting the drive from the electric motor to the bead breaking arm or to the wheel support assembly comprise:
a drive selector device mounted on the drive shaft;
first drive transmission means mounted on the drive shaft and adapted to transmit the drive to the wheel support assembly;
second drive transmission means mounted on the drive shaft and adapted to transmit the drive to the bead breaking arm; and wherein
the drive selector device is able to be removably coupled to the first or the second drive transmission means.

11. The tyre changing machine according to claim 10, comprising:
- control means, activatable by an operator, for activating the bead breaking arm;
- a control rod having a first and a second ends and connected, at the first end, to the drive selector device and, at the second end, to a control and stop element associated to the means for transmitting drive from the electric motor to the bead breaking arm;
- a flexible control member, activatable by the control means and operatively connected to the control rod, for coupling the drive selector device to the first and/or second drive transmission means and for displacing the control and stop element from a rest position, in which said control and stop element is in a distal position with respect to the means for transmitting drive from the electric motor to the bead breaking arm, to an operating position, in which said control and stop element is in a proximal position with respect to the means for transmitting drive from the electric motor to the bead breaking arm.

12. The tyre changing machine according to claim 11, wherein the control means comprise a lever mounted on the bead breaking arm in proximity of the bead breaking tool.

13. The tyre changing machine according to claim 1, wherein the rod element comprises a non-threaded second portion abutting the first portion of the rod element.

14. The tyre changing machine according to claim 13, wherein the first portion of the rod element is proximal the frame and the second portion of the rod element is proximal the bead breaking tool.

15. The tyre changing machine according to claim 13, wherein the rod element performs a purely translational movement.

* * * * *